United States Patent [19]
Otani

[11] Patent Number: 5,367,522
[45] Date of Patent: Nov. 22, 1994

[54] MULTIMEDIA COMMUNICATING APPARATUS

[75] Inventor: Masatoshi Otani, Yokohama, Japan

[73] Assignee: Canon Kabushiki Kaisha, Tokyo, Japan

[21] Appl. No.: 836,913

[22] Filed: Feb. 19, 1992

[30] Foreign Application Priority Data

Feb. 21, 1991 [JP] Japan .................................. 3-048887
May 20, 1991 [JP] Japan .................................. 3-143827

[51] Int. Cl.$^5$ ............................................. H04J 3/22
[52] U.S. Cl. ................................... 370/84; 370/110.1; 370/112; 370/118
[58] Field of Search ........................ 370/62, 77, 79, 84, 370/110.1, 112, 118; 358/86, 142, 143, 85, 141; 379/53, 54, 93, 94, 96, 100; 381/2; 455/5.1; 375/7, 122, 36; 348/1, 6, 14, 384, 461, 462, 467, 469, 473

[56] References Cited

U.S. PATENT DOCUMENTS

| | | | |
|---|---|---|---|
| 4,631,720 | 12/1986 | Koeck | 370/84 |
| 4,658,152 | 4/1987 | Walters | 370/84 |
| 4,698,801 | 10/1987 | Hatano et al. | 370/84 |
| 4,787,085 | 11/1988 | Suto et al. | 370/110.1 |
| 4,864,562 | 9/1989 | Murakami et al. | 370/84 |
| 4,888,766 | 12/1989 | Ogasawara | 370/110.1 |
| 4,998,248 | 3/1991 | Matsuzaki | 370/110.1 |
| 4,999,831 | 3/1991 | Grace | 358/143 |
| 5,005,171 | 4/1991 | Modisette, Jr. et al. | 370/84 |
| 5,164,938 | 11/1992 | Jurkevich et al. | 370/84 |

Primary Examiner—Alpus H. Hsu
Attorney, Agent, or Firm—Fitzpatrick, Cella, Harper & Scinto

[57] ABSTRACT

Multimedia communication apparatus includes a communication unit that transmits and receives plural types of media information in multiplexed form. When the communication unit is to transmit a first type of media information, a large-capacity transfer speed is allocated to transmission of the first type of media information by first transmission speed selection, but when the communication unit is to receive the first type of media information, a small-capacity transfer speed is allocated to the transmission of the first type of media information, so as to receive the first type of media information and transmit necessary control data. The data transmission speed is flexibly changed dependent on the multiplexed condition of other than data type media information to enable smoother multimedia communication.

11 Claims, 16 Drawing Sheets

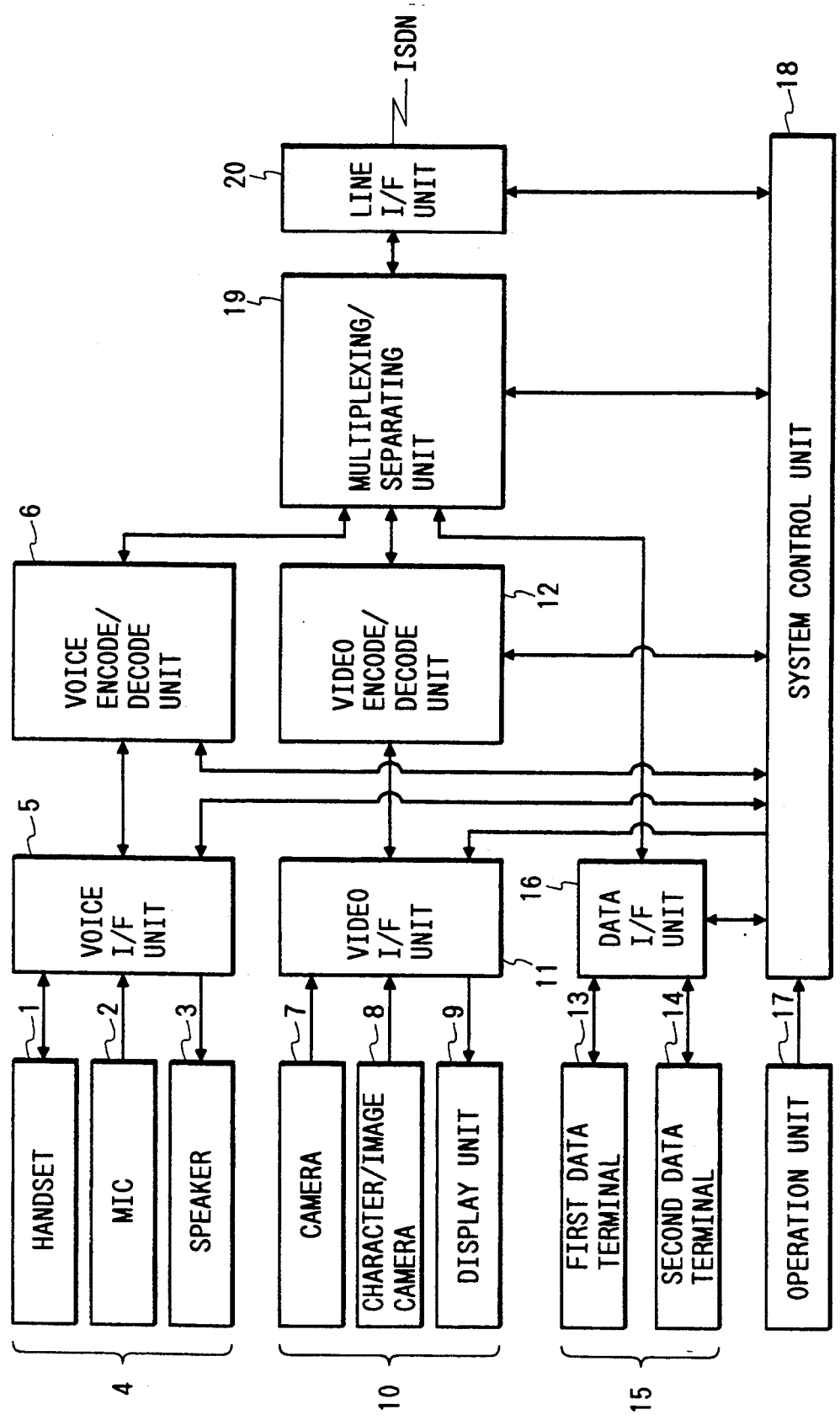

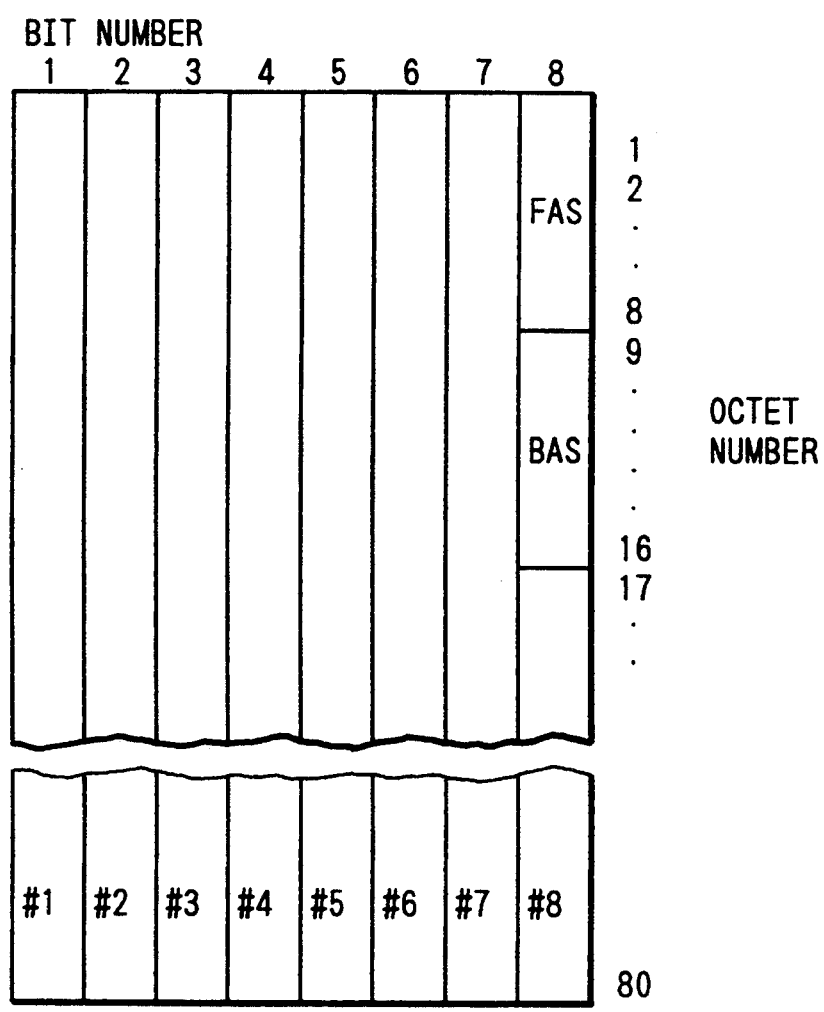

FIG. 3A

| | SUB-MULTIFRAME NUMBER | FRAME NUMBER | FRAME SYNC SIGNAL (FAS) | | | | | | | |
|---|---|---|---|---|---|---|---|---|---|---|
| | | | b1 | b2 | b3 | b4 | b5 | b6 | b7 | b8 |
| MULTI-FRAME | SMF1 | 0 | N1 | 0 | 0 | 1 | 1 | 0 | 1 | 1 |
| | | 1 | 0 | 1 | A | E | C1 | C2 | C3 | C4 |
| | SMF2 | 2 | N2 | 0 | 0 | 1 | 1 | 0 | 1 | 1 |
| | | 3 | 0 | 1 | A | E | C1 | C2 | C3 | C4 |
| | SMF3 | 4 | N3 | 0 | 0 | 1 | 1 | 0 | 1 | 1 |
| | | 5 | 0 | 1 | A | E | C1 | C2 | C3 | C4 |
| | SMF4 | 6 | N4 | 0 | 0 | 1 | 1 | 0 | 1 | 1 |
| | | 7 | 0 | 1 | A | E | C1 | C2 | C3 | C4 |
| | SMF5 | 8 | N5 | 0 | 0 | 1 | 1 | 0 | 1 | 1 |
| | | 9 | 1 | 1 | A | E | C1 | C2 | C3 | C4 |
| | SMF6 | 10 | L1 | 0 | 0 | 1 | 1 | 0 | 1 | 1 |
| | | 11 | 1 | 1 | A | E | C1 | C2 | C3 | C4 |
| | SMF7 | 12 | L2 | 0 | 0 | 1 | 1 | 0 | 1 | 1 |
| | | 13 | L3 | 1 | A | E | C1 | C2 | C3 | C4 |
| | SMF8 | 14 | TEA | 0 | 0 | 1 | 1 | 0 | 1 | 1 |
| | | 15 | R | 1 | A | E | C1 | C2 | C3 | C4 |

FIG. 3B

| | BITRATE ALLOCATION SIGNAL (BAS) | | | | | | | |
|---|---|---|---|---|---|---|---|---|
| | b9 | b10 | b11 | b12 | b13 | b14 | b15 | b16 |
| EVEN-NUMBER FRAME | B0 | B1 | B2 | B3 | B4 | B5 | B6 | B7 |
| ODD-NUMBER FRAME | P2 | P1 | P0 | P4 | P3 | P5 | P6 | P7 |

VOICE INFORMATION 16Kbps
ANIMATION INFORMATION 108.8Kbps

VOICE INFORMATION 16Kbps
ANIMATION INFORMATION 46.4Kbps

DATA INFORMATION 62.4Kbps

FIG. 13

| TRANSMISSION | | | | RECEPTION | | | |
|---|---|---|---|---|---|---|---|
| BAS | VOICE TRANSFER SPEED (A) | ANIMATION TRANSFER SPEED (V) | DATA TRANSFER SPEED (D) | BAS | VOICE TRANSFER SPEED (A) | ANIMATION TRANSFER SPEED (V) | DATA TRANSFER SPEED (D) |
| IT IS ASSUMED THAT H221/H241 SYNTHESIZING PROCEDURE, ABILITY INFORMATION EXCHANGE SEQUENCE AND MODE SWITCH SEQUENCE HAVE BEEN COMPLETED. | | | | | | | |
| A 16Kbps | 16 | 46.4 | — | A 16Kbps | 16 | 46.4 | — |
| V ON | 16 | 46.4 | — | V ON | 16 | 46.4 | — |
| . | . | . | . | . | . | . | . |
| A 16Kbps | 16 | 46.4 | — | . | . | . | . |
| V ON | 16 | 46.4 | — | . | . | . | . |
| A→ D1200bps LSD ON | 16 | 46.4 | — | . | . | . | . |
| A 16Kbps | 16 | 45.2 | 1.2 | . | . | . | . |
| V ON | 16 | 45.2 | 1.2 | . | . | . | . |
| D1200bps LSD ON | 16 | 45.2 | 1.2 | . | . | . | . |
| . | . | . | . | A 16Kbps | 16 | 46.4 | — |
| . | . | . | . | V ON | 16 | 46.4 | — |
| B→ D14.4Kbps LSD ON | 16 | 45.2 | 1.2 | D1200bps LSD ON | 16 | 46.4 | — ←E |
| A 16Kbps | 16 | 32 | 14.4 | A 16Kbps | 16 | 45.2 | 1.2 |
| V ON | 16 | 32 | 14.4 | . | . | . | . |
| . | . | . | . | . | . | . | . |
| C→ D1200bps LSD ON | 16 | 32 | 14.4 | . | . | . | . |
| A 16Kbps | 16 | 45.2 | 1.2 | . | . | . | . |
| . | . | . | . | D LSD OFF | 16 | 45.2 | 1.2 ←F |
| . | . | . | . | A 16Kbps | 16 | 46.4 | — |
| D→ D LSD OFF | 16 | 45.2 | 1.2 | . | . | . | . |
| A 16Kbps | 16 | 46.4 | — | . | . | . | . |
| . | . | . | . | . | . | . | . |

MULTIMEDIA COMMUNICATING APPARATUS

BACKGROUND OF THE INVENTION

1. Field of the Invention

The present invention relates to a multimedia communicating apparatus as typically represented by an AV (Audio Visual) communicating apparatus such as television telephone or conference system, and more particularly to a multimedia communicating apparatus for communicating multimedia information, such as voice information, video information and data information, in a multiplexed form.

2. Related Background Art

Recently, with start of practical use of communication service through ISDN lines, attention has been focused on AV (Audio Visual) service, such as a television telephone or conference system, using such ISDN lines. For the AV service, CCITT (International Telegraph and Telephone Consultive Committee) has prepared international standardization norms and published their drafts. Service regulations, protocol rules, multimedia multiplexing frame structure rules, animation information encoding schemes, etc. for AV service, by way of example, have been published as CCITT recommendation or recommendation drafts H.221, H.230, H.242, H.261, H.320, etc.

More specifically, H.221 defines the frame structure and exchange of terminal ability in the AV service over B channels with a transfer speed of 64 kbps to 1920 kbps, as well as encoding allocation of BAS (Bit rate Allocation Signal) used in, for example, designating a communication mode. H.230 specifies, as additional information to functions necessary for the AV service, various kinds of control and notice which require synchronization of transferred frames or an urgent response. H.242 defines protocols for ability exchange and communication mode switch between AV terminals using BAS. H.261 specifies animation information encoding/decoding schemes at speeds of p×64 kbps (p=1 to 30 channels). Further, H.320 defines a general outline of the AV service system.

When carrying out multimedia communication of video information (animation information), voice information and data information (all user information other than video information and voice information) in accordance with the above CCITT recommendation or recommendation drafts, transfer speeds of the respective media information are determined as follows. The transfer speed of voice information is determined by designating the speed of a voice operation mode, and the transfer speed of data information is determined by designating the speed of a data mode. Then, the transfer speed of video information is the rest resulted by subtracting both the transfer speeds of voice information and data information from the capacity (i.e., the total transfer speed) of effective communication lines available in intercommunication. Accordingly, the transfer speed of video information is variable depending on the transfer speeds of other media information.

The transfer speed of data information is assumed to be adapted for a variety of cases from one transmitting a large quantity of information as required in G3 or G4 facsimile communication, to another transmitting only a small quantity of information as represented by pointing information. Depending on the type of data used, any of LSD (low Speed Data), HSD (High Speed Data), L-MLP (Low Speed Data by Multi-Layer Protocol) and H-MLP (High speed Data by Multi-Layer Protocol) can be selected. Stated otherwise, this type multimedia communicating apparatus is able to effect communication by selecting, at the time of starting data transfer, HSD or H-MLP when a large quantity of information is to be transferred as required in G3 facsimile communication, and LSD or L-MLP when a small quantity of information is to be transferred as represented by pointing information.

In the above conventional multimedia communicating apparatus, however, due consideration has not been paid to the fact that in the case of transmitting and receiving data information by utilizing G4 facsimile communication, for example, the communication from the transmission side to reception side needs a high-speed data channel (e.g., HSD) because a large quantity of information is to be transmitted in this direction, whereas the communication from the reception side to the transmission side only needs a low-speed data channel (e.g., LSD) because a small quantity of control data is transmitted in this direction as protocols of the G4 communication necessary for negotiation with the partner's terminal. This gives rise to a problem that the same data transfer speed, i.e., a data channel of the same capacity, is allocated to both the transmission side and the reception side, resulting in a waste of the channel capacity.

With regards to data information for which abrupt variations in a quantity of data are supposed depending on input conditions by a user, such as encountered in telewriting to transfer information of voice, hand-written characters and/or figures in real time, the CCITT recommendation draft H.221 specifies the data channel variable in speeds over B channels. According to the CCITT recommendation draft H.221, however, it is only possible that the data channel is made variable in speeds over B channels, meaning that video information and data information cannot be multiplexed with each other. Thus, due consideration has not been paid to data information which is transmitted in multiplexed relation to video information and may undergo abrupt variations in a quantity of information. In other words, where data is multiplexed with video information, it is usual to allocate a required data channel at the time of starting transfer of telewriting information and employ the data channel continuously as it is.

The above method has, however, suffered from a problem as follows. When a large capacity is allocated to the data channel, the transfer capacity of the data channel is entirely wasted while telewriting information is not being inputted. On the contrary, when the quantity of telewriting information to be inputted is larger than the allocated capacity of the data channel, a delay in the information transfer may be increased to such an extent that the difference between pictures on the transmission side and the reception side causes users to have some unusual feeling.

FIG. 18 shows basic communication processing procedures as needed when communicating multimedia information such as video information, voice information and data information by utilizing a plurality connections in accordance with the above CCITT recommendation or recommendation drafts, but these procedures have accompanied the following disadvantage. Description will be first made of FIG. 18. Note that the term "connection" is used herein to mean one or more channels.

At first, a multimedia communicating apparatus attempting to start communication (hereinafter referred to as a transmission side communicating apparatus) is initiated to operate, whereupon the first connection is established in a step S701. This step corresponds to a call setting sequence by a D channel in the case of ISDN lines. Then, a step S702 establishes the frame synch through search and detection of FAS and delivery and detection of A bit=0 over the set connection (corresponding to a B channel, an H channel or the like in ISDN). After that establishment of the frame synch, the ability information exchange is performed in a step S703 to judge whether or not a reception side (partner's) communicating apparatus has an ability of setting an additional connection, through the ability information exchange sequence by transmission and reception detection of BAS.

Subsequently, processing goes to a step S704 to judge, based on the ability information in the step S703, whether or not setting of an additional connection is necessary. If the reception side communicating apparatus has an ability of setting an additional connection, then this means that the additional connection is required to be set. Therefore, processing goes to a step S705 to establish (set) the additional connection. Thereafter, a step S706 performs the process of establishing the frame synch, the multiframe synch and the first channel synch through search and detection of FAS and utilization of A bit over the additional connection.

Then, processing returns to the step S704 to judge again whether or not setting of an additional connection is necessary. If the step S704 judges no necessity of setting the additional connection as a result of that the reception side communicating apparatus has lost the ability of setting an additional connection, then a step S707 switches a transmission mode and a reception mode through transmission and reception detection of BAS commands. Next, a step S708 carries out multiplexing communication of the multimedia information in the transmission and reception modes established in the step S708, followed by ending the processing operation.

Alternatively, the transmission and reception mode switch sequence executed in the above step S707 using BAS commands may be performed immediately after the execution of the step S703, or each time the connection is added in the step S705.

It should be appreciated that the above CCITT recommendation (or recommendation drafts) includes no particular provisions about whether initiating the operation to establish an additional connection is to be carried out in the transmission side communicating apparatus or the reception side communicating apparatus, and about what is a concrete trigger to be used for that initiation. Moreover, no particular provisions are included therein also about how to handle the situation if the setting of an additional connection could not be established by the call control procedures for the D channel in ISDN, for example.

In the above conventional multimedia communicating apparatus shown in FIG. 18, however, since the additional connection is set unconditionally after the step S704 has judged, based on the ability information due to the ability information exchange sequence in the step S703, that the reception side communicating apparatus also has an ability of setting an additional connection, the user is not required to perform the specific operation directed at the setting of an additional connection, but to the contrary, the additional connection is automatically set more than necessary, which results in a problem of wasteful buildup of the line charge.

Meanwhile, there has accompanied a problem of making the operation troublesome in the communicating apparatus of the opposite type that the setting of an additional connection must be always initiated upon the manual operation of the user.

In the communicating apparatus that the same operation is carried out simply for all the partners (reception side communicating apparatus), a great deal of waste has been experienced in economy because the additional connection is set to be of no use depending on only the partner's ability of setting plural additional connections, or because not only those partners giving rise to higher line charges with a long distance like oversea communication, but also those partners giving rise to lower line charges with a short distance are all handled equally.

Further, when the additional connection could not be set eventually after initiating the operation to set an additional connection, the operation of retrying to set an additional connection must be manually initiated by the user. This raises a problem that the need of such operation causes the user to feel troublesome, or that since the intercommunication can be eventually effected even with no additional connections, the communication is completed without retrying to set an additional connection.

Moreover, even when the cause of preventing the setting of an additional connection is detected by the reception side transmitting apparatus, the situation is handled by the reception side transmitting apparatus only retrying the procedures of setting of an additional connection for the reception side transmitting apparatus, or by only the manual operation by the user. This raises another problem that the procedures of setting an additional connection are uselessly initiated for retry and the additional connection cannot be set again even with the initiation retried.

SUMMARY OF THE INVENTION

The present invention is to eliminate the above mentioned disadvantages in the prior art, and its object is to provide a multimedia communicating apparatus which can efficiently perform multimedia communication at a desired transfer speed.

Another object of the present invention is to provide a multimedia communicating apparatus which can transfer a great deal of data at a high speed during transmission of data information.

Still another object of the present invention is to provide a multimedia communicating apparatus which can transmit control data at a low transfer speed and also transfer other media information such as voice and image at a high speed during reception of data information.

Still another object of the present invention is to provide a multimedia communicating apparatus which can change a transfer speed of data information to an appropriate speed depending on variations in a quantity of data information during transmission and reception of data information in which the quantity of data information is varied.

Still another object of the present invention is to provide a multimedia communicating apparatus which can alleviate the operation to be manually operated when setting an additional connection (channel), and also prevent wasteful build-up of the line charge.

Still another object of the present invention is to provide a multimedia communicating apparatus which can realize a communication environment in a desired mode without making a user conscious of intricacy in the operation.

Still another object of the present invention is to provide a multimedia communicating apparatus which can offer positive execution of the additional connection setting procedures, and also enables the user of a reception side communicating apparatus to set a desired mode without requiring an special operation.

Still another object of the present invention is to provide a multimedia communicating apparatus which can realize an even more reasonable communication environment.

Still another object of the present invention is to provide a multimedia communicating apparatus which, when setting an additional connection, can selectively set an automatic setting mode where the additional connection is automatically set, and a manual setting mode where the additional connection is manually set based on judgment of the user.

Still another object of the present invention is to provide a multimedia communicating apparatus with which, when an additional connection has not been set from a transmission side communicating apparatus even after the elapse of a certain time, the additional connection is automatically set from the reception side communicating apparatus.

The above and other objects of the present invention will be apparent from the attached drawings and the following detailed description with reference to the drawings.

BRIEF DESCRIPTION OF THE DRAWINGS

FIG. 1 is a block diagram showing one embodiment of a multimedia communicating apparatus according to the present invention.

FIG. 2 is a diagram of the frame structure specified in the CCITT recommendation draft H.221.

FIGS. 3A and 3B are diagrams of bit allocation of FAS and BAS in one multiframe specified in the CCITT recommendation draft H.221.

FIG. 13 is a diagram showing one example of transmission and reception of BAS commands in units of subframe according to the CCITT recommendation draft H.221.

DETAILED DESCRIPTION OF THE PREFERRED EMBODIMENTS

<First Embodiment>

Figure 4:
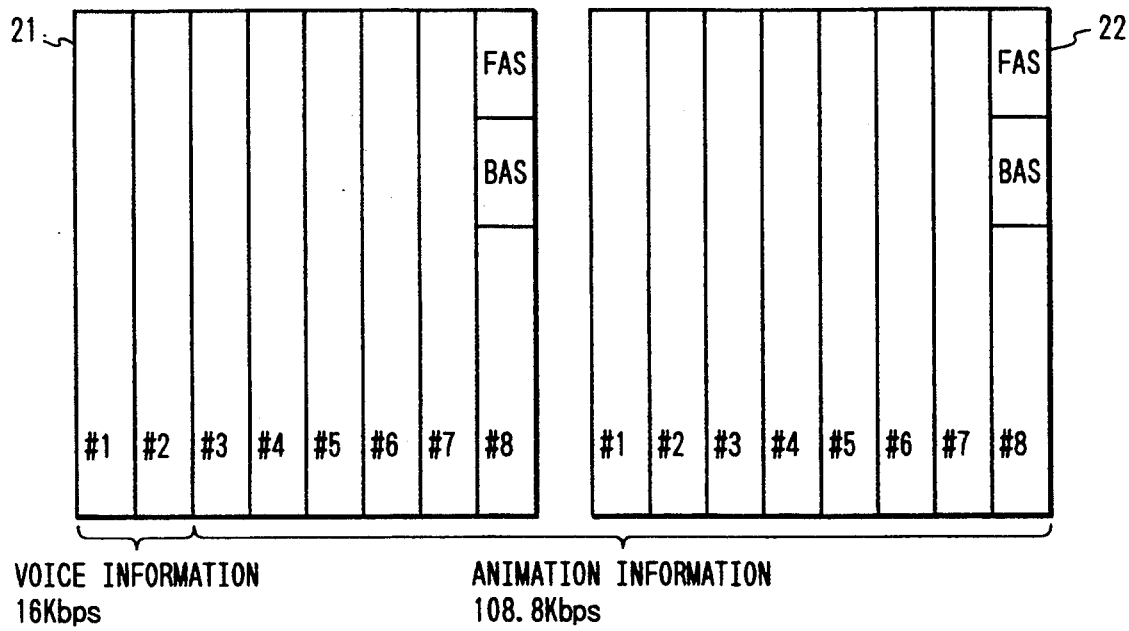
FIG. 4 is a diagram of the frame structure showing one example of multiplexed condition at the time of starting transmission and reception in the multimedia communicating apparatus according to the present invention.

Hereinafter, a first embodiment of the present invention will be described in detail with reference to the drawings.

FIG. 1 is a block diagram showing the configuration of a multimedia communicating apparatus according to a first embodiment of the present invention.

In FIG. 1, denoted by 1 is a handset through which voices are inputted and outputted, 2 is a microphone through which voices are inputted, and 3 is a loudspeaker through which voices are outputted. In this embodiment, the handset 1, the microphone 2 and the loudspeaker 3 jointly constitute a voice input/output means 4.

Denoted by 5 is a voice I/F (interface) unit which performs the switch process of switching the handset 1, the microphone 2 and the loudspeaker 3 of the voice input/output means 4 from one to another, the on/off-hook detection process of detecting whether the handset 1 is in an on-hook state or an off-hook state, the echo cancel process of eliminating an echo when the microphone 2 and the loud-speaker 3 are used, the process of producing tones such as a dial tone, call tone, busy tone and reception tone, etc. 6 is a voice encode/decode unit to encode a transmission voice signal and decode a reception voice signal in accordance with the voice signal encoding and decoding rules such as 64 kbps PCM A-law, 64 kbps PCM μ-law, 64 kbps/56 kbps/48 kbps SB-ADPCM, 32 kbps ADPCM, 16 kbps (e.g., APC-AB), and 8 kbps.

Denoted by 7 is a camera through which a self-portrait or the like is inputted, and 8 is a character/image camera through which pictures, drawings or the like are inputted. 9 is a display unit comprising a display screen and so forth to display images inputted from the camera 7 or the character/image camera 8 and images received from a partner's communicating terminal. In this embodiment, the camera 7, the character/image camera 8 and the display unit 9 jointly constitute an image input/output means 10.

Denoted by 11 is a video I/F unit which performs the switch process of switching the camera 7 and the character/image camera 8 from one to the other, the display switch process of switching a transmission image and a reception image on the display screen from one to the other, the image signal synthesis process of displaying the transmission image and the reception image on the display screen in a divided form, etc. 12 is a video encode/decode unit for encoding the transmission image and decoding the reception image in accordance with the CCITT recommendation draft H.261.

Denoted by 13 is a first data terminal used for transmitting a large quantity of information as required in G4 facsimile communication, and 14 is a second data terminal for handling such information, like telewriting information, that a quantity of data transmitted is usually relatively small, but may be abruptly varied depending on an input condition by the user. In this embodiment, the first data terminal 13 and the second data terminal 14 jointly constitute a data input/output means 15. 16 is a data I/F unit.

Denoted by 17 is an operation unit comprising a keyboard, a touch panel or the like through which various kinds of control information are inputted. 18 is a system control unit which comprises CPU, ROM, RAM, auxiliary storages and so forth, and has such functions as to monitor states of the voice I/F unit 5, the video I/F unit 11 and other units for controlling the entire apparatus, calculate transfer speeds allocated for respective media and make final judgment and control of a mode based on the input control information, line conditions in use, etc., create the desired display screen depending on the situations, and execute an application program.

Denoted by 19 is a multiplexing/separating unit which functions to convert a transmission voice signal from the voice encode/decode unit 6, a transmission imge signal from the video encode/decode unit 12 and data from the data I/F unit 16 into information signals in accordance with the CCITT recommendation draft H.221, multiplex those information signals in units of transmission frame by using data from the system control unit 18 and control information such as the CCITT recommendation drafts H.221 and H.242 as BAS, and further separate reception frames into component units of respective media and BAS, followed by informing them to the respective units (such as the voice encode/decode unit 6, the video encode/decode unit 12 and the data I/F unit 16).

Denoted by 20 is a line I/F unit for controlling lines in accordance with a user network interface for ISDN (CCITT recommendation 1 series) using commands transferred to and from the system control unit 18.

In the multimedia communicating apparatus thus arranged, after operating the operation unit 17 to set a channel connecting with a partner's terminal apparatus, voice information, animation information (video information) and data information are inputted.

When voices are inputted through the handset 1 or the microphone 2, the voice I/F unit 5 executes the predetermined process upon an instruction from the system control unit 18 so that a transmission voice signal is inputted to the voice encode/decode unit 6. In the voice encode/decode unit 6, the transmission voice signal is encoded in accordance with the predetermined encoding rules upon an instruction from the system control unit 18, following which the transmission voice signal is sent to the multiplexing/separating unit 19. Then, in the multiplexing/separating unit 19, the transmission voice signal is multiplexed in units of transmission frame together with other signals, followed by delivery to the partner's communicating terminal via the predetermined line control (the CCITT recommendation I series) in the line I/F unit 20.

When an animation image is inputted from the camera 7 or the character/image camera 8, the video I/F unit 11 executes the predetermined process upon instruction from the system control unit 18 so that a transmission image signal is inputted to the video encode/decode unit 12. In the video encode/decode unit 12, the transmission image signal is encoded in accordance with the predetermined encoding rules upon an instruction from the system control unit 18 (the CCITT recommendation draft H.261), following which the transmission image signal is sent to the multiplexing/separating unit 19. Then, in the multiplexing/separating unit 19, the transmission image signal is multiplexed in units of transmission frame together with other signals, followed by delivery to the partner's communicating terminal via the predetermined line control (the CCITT recommendation 1 series) in the line I/F unit 20. In the transmission of the image signal, the transmission image may be displayed on the display unit 9 to monitor the input information.

Further, when data information is inputted to the first data terminal 13 or the second data terminal 14, the data I/F unit 16 executes the predetermined process upon an instruction from the system control unit 18, and the data information is sent to the multiplexing/separating unit 19. Then, in the multiplexing/separating unit 19, the data information is multiplexed in units of transmission frame together with other signals, following which the transmission data is delivered to the partner's communicating terminal via the predetermined line control (the CCITT recommendation I series) in the line I/F unit 20.

On the other hand, when signal information is received from the partner's communicating terminal, the signal information is sent to the multiplexing/separating unit 19 via the predetermined line control (the CCITT recommendation I series) in the line I/F unit 20.

Then, reception frames are separated into the component units of respective media and BAS in the multiplexing/separating unit 19, and the resultant signal information is sent to the respective units.

More specifically, in the case of the reception signal information being a reception voice signal, the reception voice signal is decoded in the voice encode/decode unit 6 upon an instruction from the system control unit 18 and, thereafter, outputted to the handset 1 or the loudspeaker 3 via the predetermined process in the voice I/F unit 5.

In the case of the reception signal information being a reception image signal, the reception image signal is decoded in the video encode/decode unit 6 upon an instruction from the system control unit 18 and, thereafter, the reception image is displayed on the display unit 9 via the predetermined process in the video I/F unit 11.

Further, in the case of the reception signal information being data information, the data information is sent from the data I/F unit 16 to the first data terminal 13 or the second data terminal 14 upon an instruction from the system control unit 18 and, thereafter, outputted from the first data terminal 13 or the second data terminal 14.

FIG. 2 is a diagram of the frame structure of a B channel with a transfer speed of 64 kbps specified in the CCITT recommendation draft H.221, as employed in the multiplexing/separating unit 19.

The numbers 1, ..., 8 on the axis of abscissa stands for bit numbers and the numbers 1, ..., 80 on the axis of ordinate stands for octet numbers, with 80 octets making up one frame. FAS (Frame Alignment Signal) is allocated to eight bits corresponding to the octet numbers 1, ..., 8 and BAS is allocated to eight bits corresponding to the octet numbers 9, ..., 16. FAS is used to, by way of example, control the frame synch and the multiframe synch, and control the function of monitoring communication quality and the notice of alarm information. BAS is used to, by way of example, designate an ability of the terminal and bit rate allocation for each medium in actual frames, and perform other various kinds of control and notice. The respective types of media information such as voice information, animation information and data information are multiplexed with one another by being allocated to the portions (sub-channels) other than those for FAS and BAS.

FIG. 3A is a diagram showing bit allocation of FAS in one multiframe. More specifically, one multiframe consists of eight sub-multiframes (SMF 1, ..., SMF 8) and one sub-multiframe consists of two frames, with particular bit signals for the frame synch allocated to respective bit positions. In FIG. 3A, N1 ... N5 indicate N bits for numbering, A indicates an A bit for achieving the frame synch, E indicates an E bit relating to error correction, C1 ... C4 indicate bits for checking the corrected contents, L1 ... L3 indicate channel numbers, TEA indicates an alarm signal, and R indicates R (reserve) bit not in use at the present, respectively.

FIG. 3B is a diagram showing bit allocation of BAS in one multiframe. As will be seen from FIG. 3B, BAS is transferred in even-number frames (0, 2, 4 ... ) and error correction bits corresponding to the thus-transferred even-number frames are transferred in odd-number frames (1, 3, 5, ..., 7).

In the above-mentioned multimedia communicating apparatus, there is provided first selection means capable of selecting, when data information is to be transmitted, an optimum maximal transfer speed of the data information depending on the sort of the data information and the multiplexed condition of other types of media information than the data information.

Figure 5A:
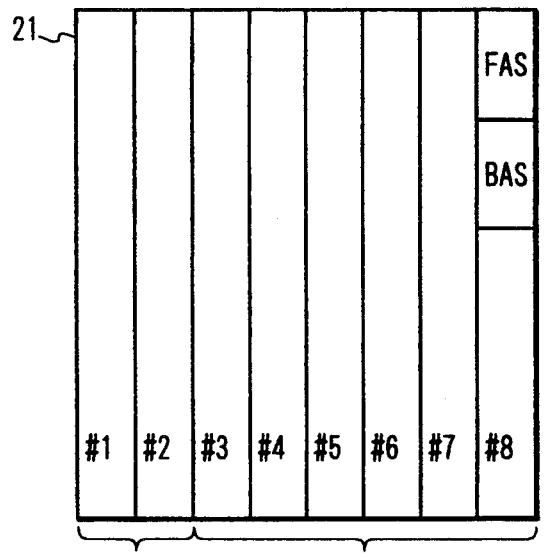
FIGS. 5A and 5B are diagrams of the frame structure showing one example of multiplexed condition when a great deal of data information is transmitted.
Figure 5B:
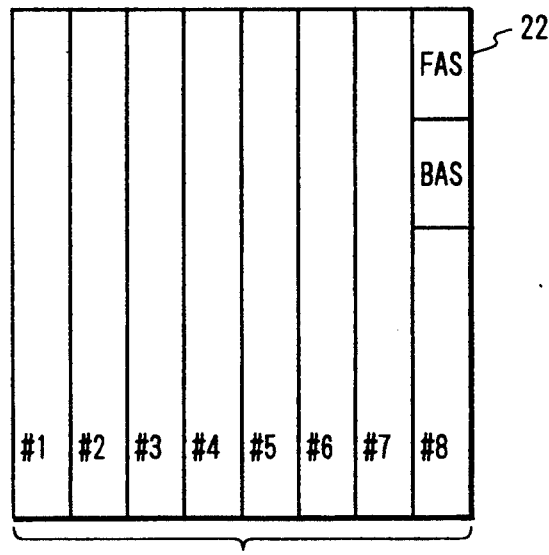

As shown in FIG. 4, for example, it is now supposed that over B channels (comprising a first B channel 21 and a second B channel 22) with a transfer speed of (2×62.4 kbps), voice information is allocated to 16 kbps and animation information is allocated to 108.8 kbps for multiplexing with each other upon a voice operation mode being designated via the operation unit 17 (the remaining 3.2 kbps being allocated to FAS and BAS in the first and second B channels 21, 22). Under this condition, in an attempt of transmitting a great deal of data information from the first data terminal 13 to the partner's communicating terminal, the allowable maximum transfer speed is selected as a data channel by the first selection means, as shown in FIGS. 5A and 5B. Specifically, when a great deal of data information is to be transmitted as required in G4 facsimile communication, the second B channel 22 is allocated to a data channel as HSD of 62.4 kbps and the first B channel 21 is allocated to both voice information of 16 kbps and animation information of 46.4 kbps for multiplexing with each other, though image quality of the animation information deteriorates to some extent, taking into account demands of transmitting the data information to the partner's communicating terminal as fast as possible and of not interrupting transmission of the voice information and/or the animation information.

Figure 6:
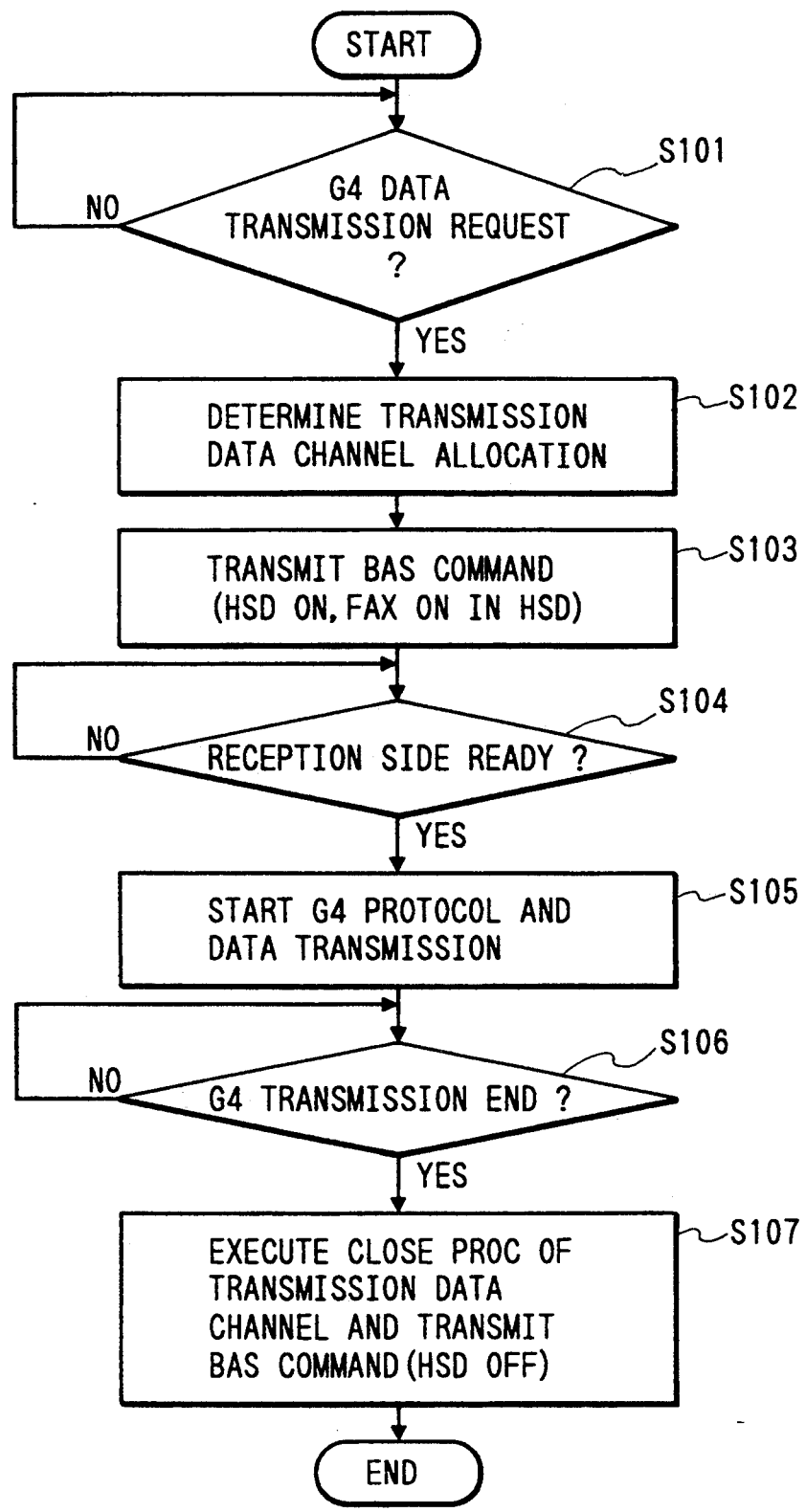
FIG. 6 is a flowchart showing one example of control procedures for transmission in the multimedia communicating apparatus.

FIG. 6 is a flowchart showing control procedures for transmission of data information in the case of a G4 facsimile machine being used as the first data terminal 13 over the B channels.

Figure 16:
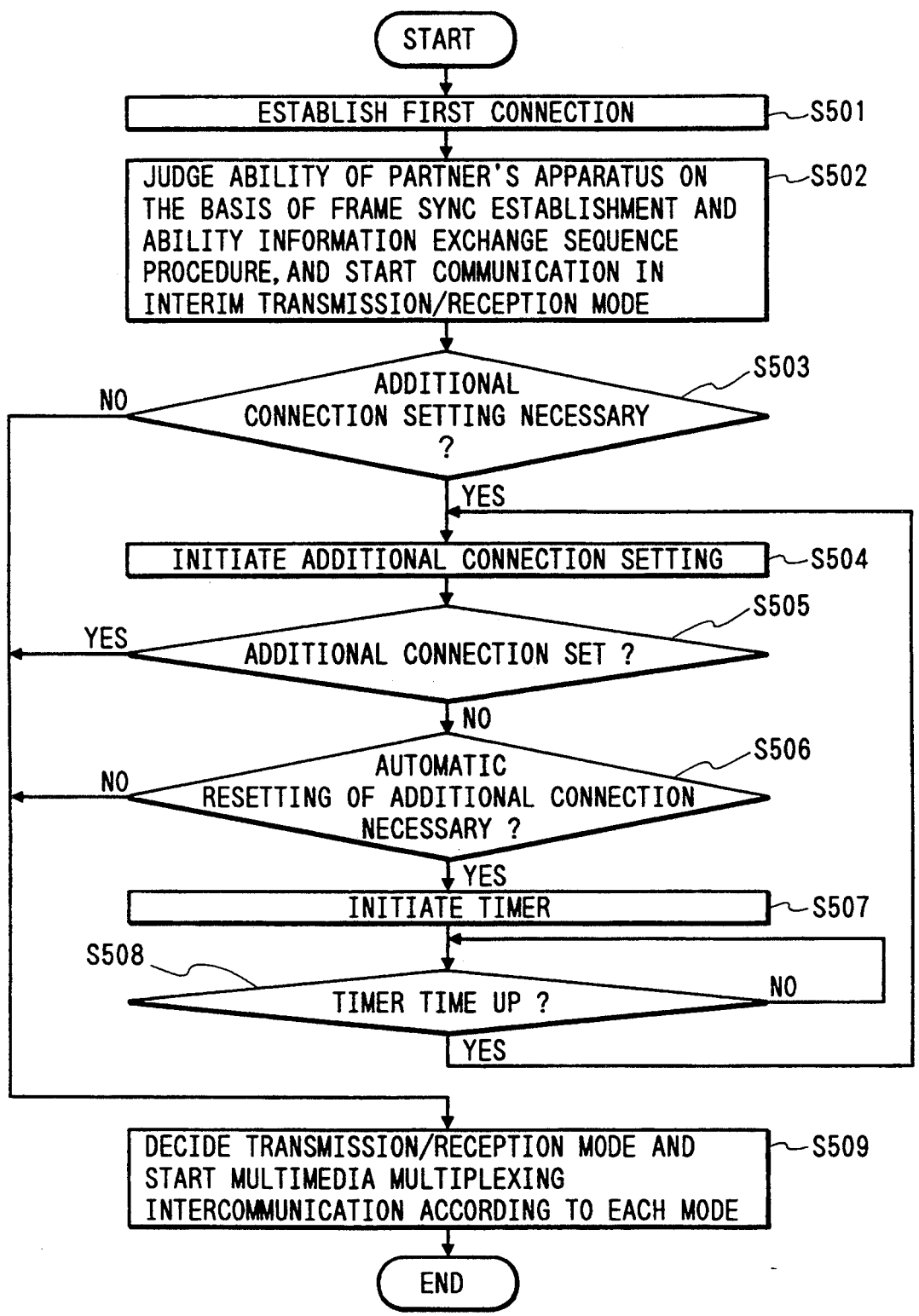

First, the apparatus waits for the occurrence of a G4 data transmission request while monitoring it at all times (step S101). When the G4 data transmission request is detected, the apparatus checks the present multiplexed condition of respective media information and allocates a data channel optimum for the G4 data transmission (step S102). Specifically, as shown in FIGS. 5A and 5B, 16 kbps is allocated to the voice information and 46.4 kbps is allocated to the animation information over the first B channel 21, respectively, while 62.4 kbps of the second B channel 22 is allocated to the data information.

Then, a command "HSD ON" is transmitted as the BAS command for change into the mode determined above (step S103). At this time, a verification command "Fax on in HSD" is also transmitted along with the above command. Next, the control program goes to a step S104 where the apparatus waits for a data channel to be allocated in the reception side terminal (step S104). In other words, because of the need of a reception side data channel through which G4 protocols are to be transmitted and received for negotiation between the terminals on both sides, the apparatus waits for the reception side terminal allocating the predetermined data channel. When the end of allocation of the data channel in the reception side terminal is detected, the protocols for G4 facsimile communication are executed to transmit the data information (step S105). Subsequently, whether the transmission of G4 data and the execution of G4 protocols are ended or not is judged (step S106). If it is judged that the transmission of G4 data and the execution of G4 protocols have been ended, then the process of closing the data channel is performed (step S107), followed by coming into the end of the program. Specifically, the data channel allocated in the step S102 is released and returned to the original state, thereby ending the program. At this time, a command "HSD OFF" is transmitted as the BAS command. Consequently, the multiplexed condition of the B channels of (2×62.4 kbps) restores again to that shown in FIG. 4.

In the above-mentioned multimedia communicating apparatus, there is also provided second selection means capable of selecting, when data information is to be received, a necessary minimum transfer speed depending on the sort of the data information.

Figure 7:
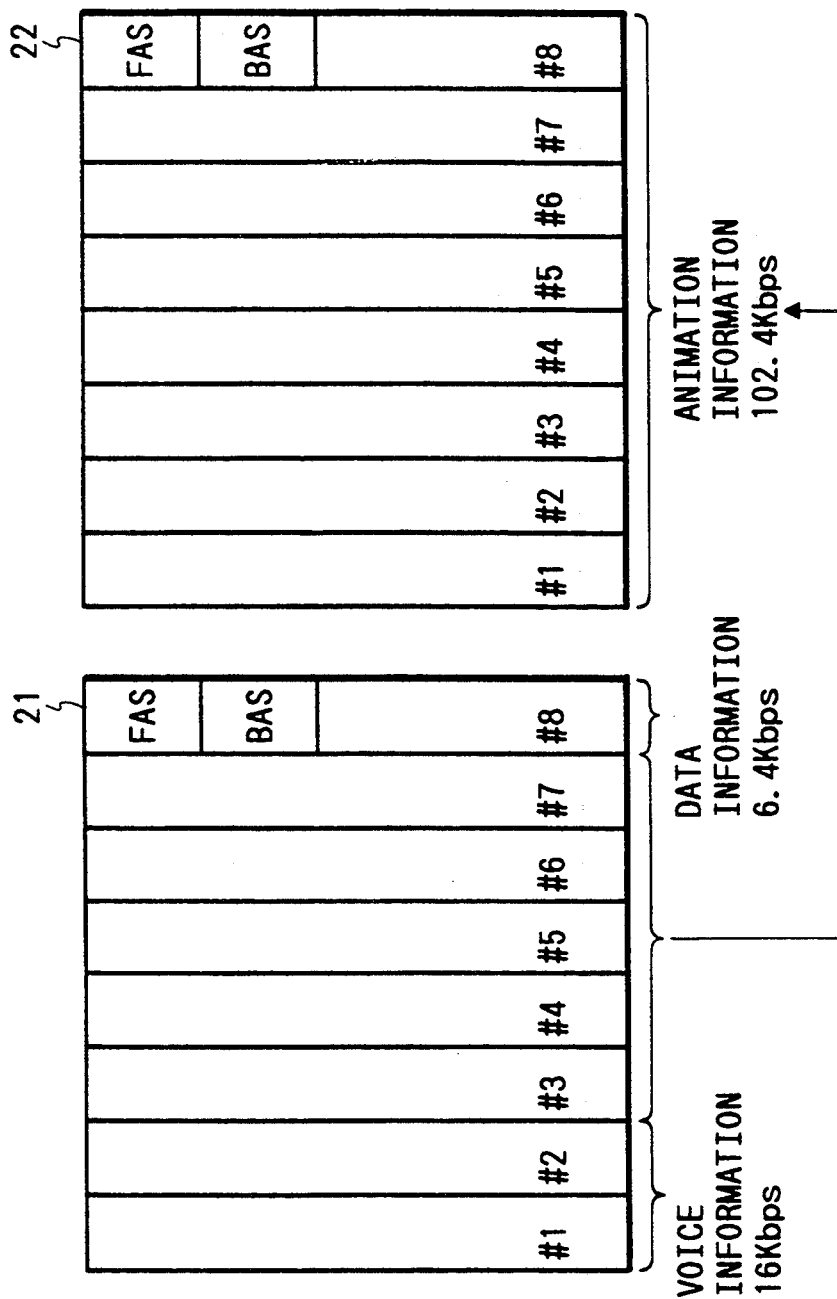
FIG. 7 is a diagram of the frame structure showing one example of multiplexed condition when a great deal of data information is received.

In reception, when it is notified from the partner's communicating terminal that a great deal of data information is to be received, for example, under a condition of the predetermined transfer speeds being allocated over the B channels as shown in FIG. 4 similarly to the above case of transmission, a necessary minimum data channel is selected by the second selection means as shown in FIG. 7. More specifically, based on a judgment that 6.4 kbps is enough to transmit only control data of the G4 protocols necessary for negotiation with the partner's terminal, 16 kbps is allocated to the voice information, LSD of 6.4 kbps is allocated to the data information, and the remaining 102.4 kbps is allocated to the animation information over the B channels of (2×62.4 kbps) for multiplexing with one another.

Stated otherwise, in the G4 facsimile communication, a great deal of data is transferred from the transmission side to the reception side, while only a small quantity of control data is transferred from the reception side to the transmission side. In addition, those two types of communication are performed not in a multiplexed form, but in a separated form. Accordingly, when receiving data from the transmission side apparatus, the reception side apparatus receives the data at a speed of 62.4 kbps in match with the transfer speed on the transmission side. Also, when receiving data from the reception side apparatus, the transmission side apparatus receives the data at a speed of 6.4 kbps in match with the transfer speed on the reception side.

Figure 8:
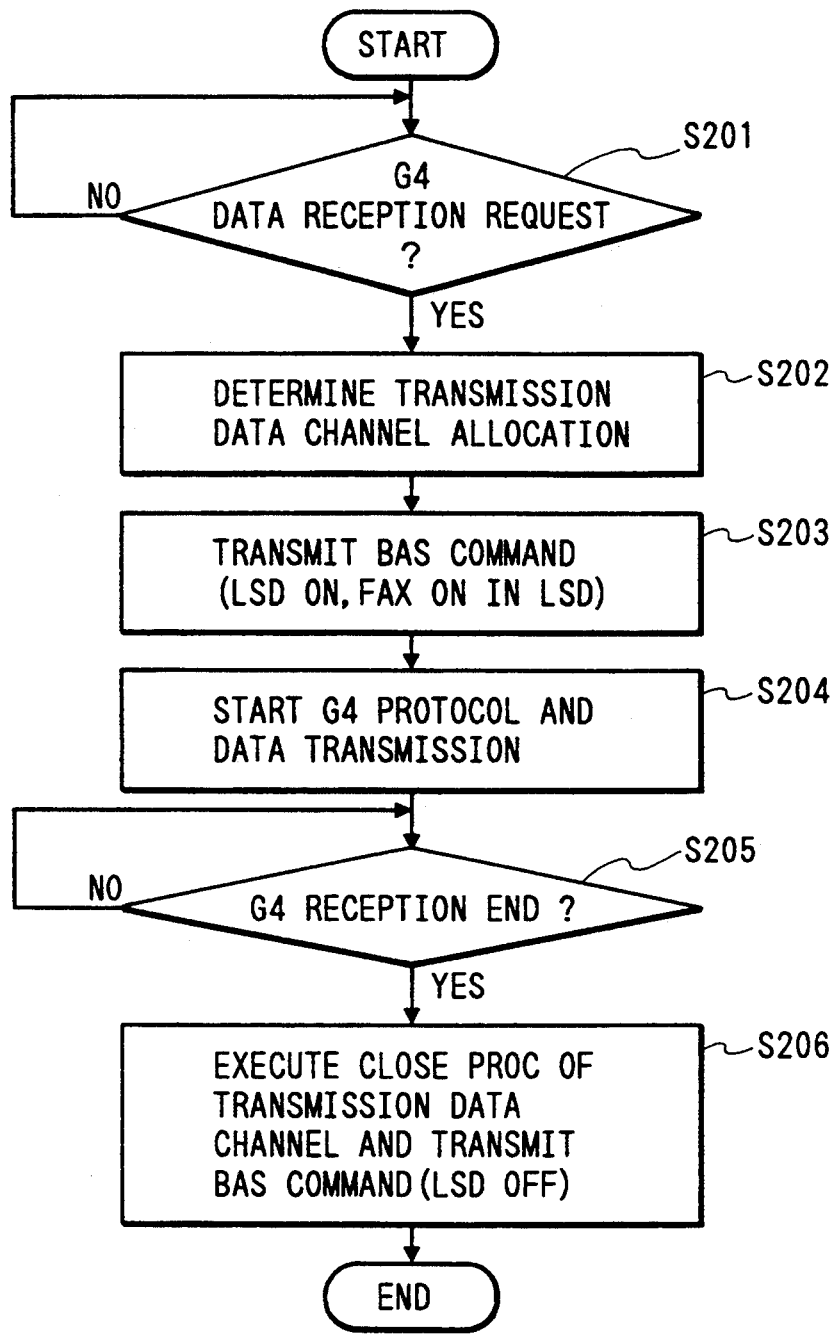
FIG. 8 is a flowchart showing one example of control procedures for reception in the multimedia communicating apparatus.

FIG. 8 is a flowchart showing control procedures for reception of data information in the case of a G4 facsimile machine being used as the first data terminal 13 over the B channels.

First, the apparatus waits for a data information reception request issued from the transmission side terminal (step S201). When the data information reception request is detected, channel allocation for the transmission data is performed (step S202). More specifically, since the reception side transmits only the G4 protocols and thus does not require a data channel for transmitting a great deal of data, a data channel for transmitting a small quantity of data, which is enough to transmit the G4 protocols, is allocated to such an extent as not deteriorating quality of other types of media transmission under operation as far as possible. In practice, as shown in FIG. 7 above, 16 kbps is allocated to the voice information, LSD of 6.4 kbps is allocated to the data information, and the remaining 102.4 kbps is allocated to the animation information for multiplexing with one another. Then, a command "LSD ON" is transmitted as the BAS command for change into the multiplexed mode determined above (step S203). At this time, a verification command "Fax on in LSD" is also transmitted along with the above command. Next, the control program goes to a step S204 where the apparatus executes the protocols for G4 facsimile communication to receive the data information, followed by judging whether the reception of the data information is ended or not (step S205). If it is judged that the reception of the data information has been ended, then the process of closing the data channel is performed as with the case of transmitting the data information, and a BAS command "LSD OFF" is transmitted to the partner's terminal (i.e., the data information transmitting side) for thereby returning to the multiplexed mode shown in FIG. 4.

In the above-mentioned multimedia communicating apparatus, there are further provided detection means for detecting an extent of variations in data information, and change means for automatically changing the transfer speed, allocated at the time of starting transmission, depending on the extent of variations detected by the detection means.

Figure 9:
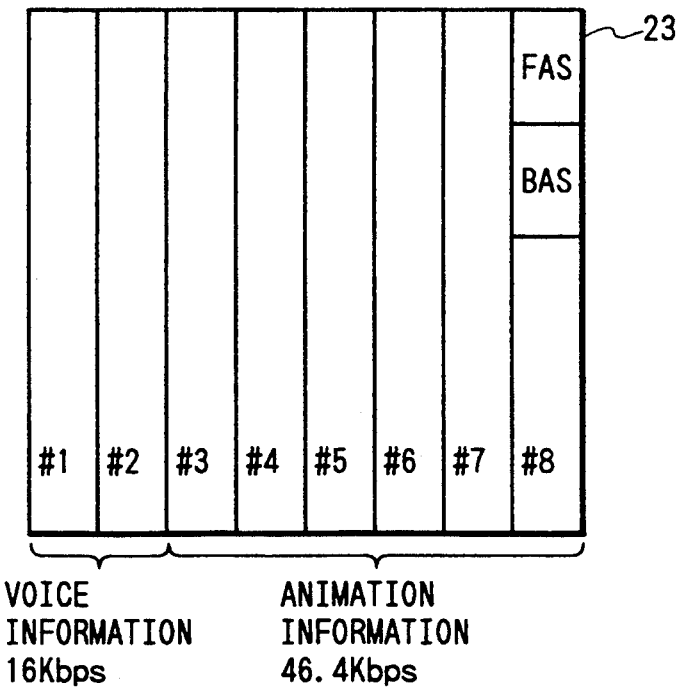
FIG. 9 is a diagram of the frame structure showing another example of multiplexed condition at the time of starting transmission and reception in the multimedia communicating apparatus.
Figure 10:
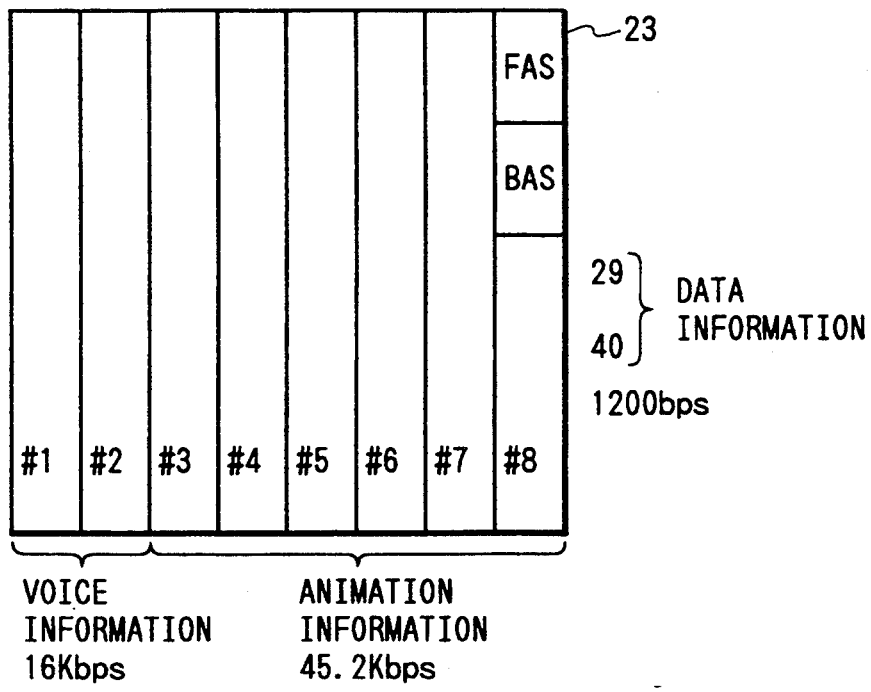
FIG. 10 is a diagram of the frame structure showing one example of multiplexed condition changed depending on variations in data information.
Figure 11:
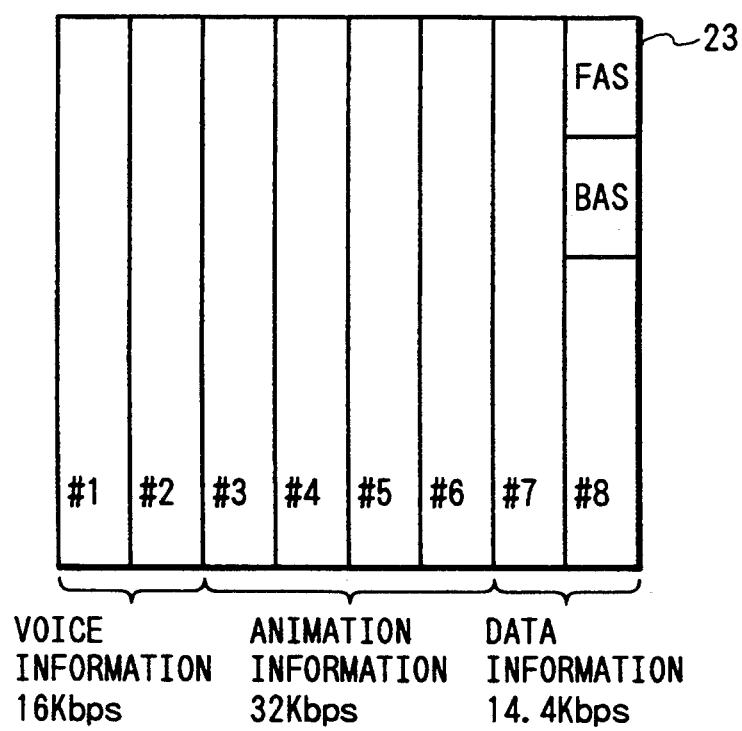
FIG. 11 is a diagram of the frame structure showing another example of multiplexed condition changed depending on variations in data information.

As shown in FIG. 9, for example, it is now supposed that over a B channel 23 with a transfer speed of (1×62.4 kbps), voice information is allocated to 16 kbps and animation information is allocated to 46.4 kbps upon a voice operation mode being designated via the operation unit 17 (the remaining 1.6 kbps being allocated to FAS and BAS). Under this condition, in an attempt of transmitting data information which may be abruptly varied in quantity, such as telewriting information from the second data terminal 14 to the partner's communicating terminal, an extent of variations in the data information is detected by the detection means at all times, permitting the change means to automatically change the transfer speed depending on the detected extent of variations as illustrated in FIGS. 10 and 11. To put it in more detail, upon detecting a variation in quantity of the data information, the system control unit 18 checks the multiplexed condition of the other types of media information. In the case where 1200 bps is judged enough for the data information to transmit the telewriting data to such an extent as not deteriorating transmission quality of other types of media information as far as possible, 16 kbps is allocated to the voice information, 1200 bps is allocated to the data information, and the remaining 45.2 kbps is allocated to the animation information for multiplexing with one another, as shown in FIG. 10. Then, when it is judged from a subsequent variation in quantity of the data information that 1200 bps is insufficient and 14.4 kbps, for example, is required for the data channel, 16 kbps is allocated to the voice information, 14.4 kbps is allocated to the data information, and the remaining 32 kbps is allocated to the animation information for multiplexing with one another, as shown in FIG. 11.

Figure 12:
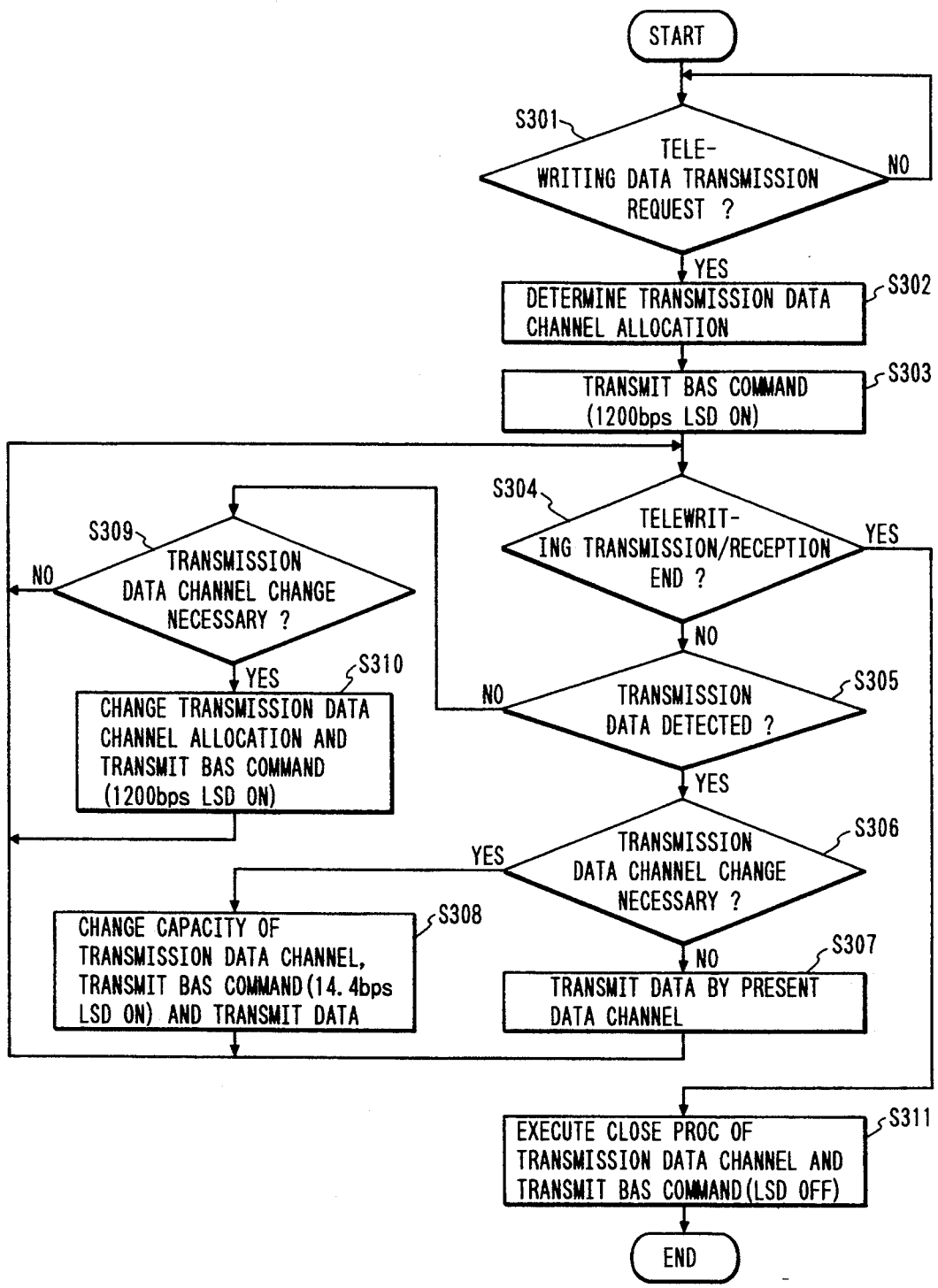
FIG. 12 is a flowchart showing one example of control procedures for transmission in the multimedia communicating apparatus.

FIG. 12 is a flowchart showing control procedures for transmission and reception of data information in the case where a telewriting information transmitting and receiving device is used as the second data terminal 14 over the B channels.

First, the apparatus waits for a telewriting data transmission/reception start request (step S301). When the telewriting data transmission/reception start request is detected, the apparatus checks the multiplexed condition of other types of media information and determines the allocation of a transmission data channel for transmitting the telewriting data to such an extent as not deteriorating transmission quality of other types of media information as far as possible (step S302). Specifically, 16 kbps is allocated to the voice information, LSD of 1200 bps is allocated to the data information, and the remaining 45.2 kbps is allocated to the animation information as shown in FIG. 10 above, for example. Then, a BAS command "1200 bps LSD ON" is transmitted for change into the multiplexed mode determined above (step S303). Subsequently, it is judged whether the transmission/reception of the telewriting data is ended or not (step S304). Since the transmission/reception of the telewriting information is now not yet performed, the decision result in the step S304 is "NO" and, therefore, the control program goes to a step S305 to judged whether the occurrence of the transmission telewriting data is detected (step S305). If the telewriting data is detected, then it is judged whether the present transmission data channel is enough in capacity for transmitting the telewriting data or not, that is to say, whether change of the data channel is necessary or not (step S306). This judgment can be made by using, as a decision basis, a queue state of the data information, for example, such as judging whether or not the queue accumulates in excess of a certain prescribed value. If the change of the present transmission data channel is judged not necessary, then the telewriting data is transmitted over the present data channel (step S307), followed by returning to the step S304 to wait for that the transmission/reception of the telewriting information comes to an end.

On the other hand, if it is judged in the step S306 that the present data channel is insufficient and the change of the present transmission data channel is judged not necessary, then the apparatus changes channel allocation to a data channel with adequate capacity, transmits a corresponding BAS command, and further executes the transmission of the telewriting data while changing the allocation of capacity in multiplexed use (step S308). Specifically, when the data channel of 14.4 kbps, for example, is judged necessary, the multiplexed condition of respective media information is rearranged by changing capacity allocation of the data channel such that 16 kbps is for the voice information, 32 kbps is for the animation information, and 14.4 kbps is for the data information as shown in FIG. 11 above. At the same time, a command "14.4 kbps LSD ON" is transmitted as the BAS command and the desired telewriting data is transmitted, followed by returning again to the judgment in the step S304.

Subsequently, if the step S305 no longer detects the data information, then it is judged whether or not the present data channel (14.4 kbps) is required to be continuously preserved, i.e., whether or not it should be returned to the data channel of 1200 bps allocated in the step S302 (step S306). If the present data channel (14.4 kbps) is judged not necessary any longer, then the allocation of the data channel is changed and the corresponding BAS command is transmitted (step S310). Specifically, the allocation of the transmission data channel is returned to the state (1200 bps) of the step S302 and a command "1200 bps LSD ON" is transmitted as the BAS command (step S309), followed by returning again to the judgment in the step S304.

On the other hand, if it is judged in the step S309 that the change of the transmission data channel is not necessary, then the control program directly returns to the judgment in the step S304.

Thereafter, if the end of transmission/reception of the telewriting data is detected in the step S304, then the process of closing the transmission data channel is performed for returning to the channel allocation state before the transmission (FIG. 9) and a command "LSD OFF" is transmitted as the BAS command (step S311), followed by the end of the program.

FIG. 13 is a diagram showing one example of transmission and reception of BAS commands in units of subframe during the control procedures shown in FIG. 12 above. Besides various BAS commands, there are also shown in FIG. 13 a voice transfer speed (A), an animation transfer speed (V) and a data transmission speed (D) corresponding to those BAS commands.

As will be seen from FIG. 13, for the BAS command transmission in the step S303, the BAS command pointed by "A→" in the transmission BAS column is sent to the reception side terminal, whereas the reception side terminal having received that BAS command sends the BAS command pointed by "←E" in the reception BAS column to the transmission side terminal. For the BAS command transmission in the step S308, the BAS command pointed by "B→" in the transmission BAS column is sent to the reception side terminal and, for the BAS command transmission in the step S310, the BAS command pointed by "C→" in the transmission BAS column is sent to the reception side terminal. Further, for the BAS command transmission in the step S311, the BAS command pointed by "D→" in the transmission BAS column is sent to the reception side terminal, whereas the reception side terminal having received that BAS command sends the BAS command pointed by "←F" in the reception BAS column to the transmission side terminal.

It is needless to say that the present invention is not limited to the foregoing first embodiment and can be modified in a range without departing from the gist of the invention. By way of example, while the foregoing first embodiment is arranged to carry out transmission/reception without interrupting the animation information even during the transmission of a great deal of data, the animation information may be interrupted temporarily to allocate the possibly largest capacity to data channel. Further, the intended object can be achieved not only in the case of transmitting a great deal of data information in one direction, but also in the case where the transmission of a great deal of data information is switched midway to occur in the reversed direction due to cession reverse control of the G4 protocols or the like, by changing the allocation of transmission/reception data channels depending on the situation.

Further, when transmitting the telewriting data, although the transmission/reception itself has been initiated by a host application, the transmission data will not occur until the user actually inputs information, and the permission may not be given to the transmission, aside from the reception, during the process of transmission right control or the like. It is therefore possible to not preserve the minimum data channel at all times, but allocate a required data channel at the time the transmission data in fact occurs. As regards the means for changing the capacity allocation of the data channel, rather than simply depending on the transmission queue state, that means is preferably arranged to enable more elaborate change process such as making calculations from the quantity of data on the transmission queue and determining the capacity of data channel so as to fall within an allowable transmission delay of the telewriting information.

With the first embodiment of the present invention, as fully described above, since the multimedia communicating apparatus connected to a communication line network for transmitting and receiving plural types of media information in a multiplexed form includes first selection means capable of selecting, when data information is to be transmitted, an optimum maximal transfer speed of the data information depending on the sort of the data information and the multiplexed condition of other types of media information than the data information, and second selection means capable of selecting, when data information is to be received, a necessary minimum transfer speed depending on the sort of the data information, the first selection means enables high-speed transmission of a great deal of data to the partner's terminal at the optimum maximal transfer speed during transmission of the data information, and the second selection means enables low-speed transmission of control data or the like to the partner's terminal at the necessary minimum transfer speed during reception of the data information. In other words, when transmitting a great deal of data information, the data information can be transferred to the partner's transmitting terminal in a shorter period of time through high-speed transmission. Meanwhile, when receiving a great deal of data information, by allocating the minimum transmission speed necessary for transmitting the protocols as the transmission speed, the transmission speeds of other types of media information are not remarkably lowered to suppress deterioration of the transmission quality, with the result of efficient multimedia communication.

Moreover, with the first embodiment of the present invention, since the multimedia communicating apparatus connected to a communication line network for transmitting and receiving plural types of media information in a multiplexed form includes detection means for detecting an extent of variations in data information, and change means for automatically changing the transfer speed, allocated at the time of starting transmission, depending on the extent of variations detected by the detection means, the transmission speed of the data information can be changed by the change means to an appropriate speed depending on the extent of variations in the data information to be transmitted. Stated otherwise, in the case of the data information being varied, by monitoring a quantity of information in the transmission data at all times and changing capacity allocation of a data channel adequately depending on the monitored quantity of information, the transmission quality of other types of media information can be prevented from deteriorating remarkably, and the data information can be transmitted without any delay.

In short, according to the first embodiment of the present invention, by flexibly changing the data transmission speed depending on the multiplexed condition of other types of media information than the data information and variations in quantity of the data information, it is possible to suppress a reduction in the transmission quality of other types of media information, select the optimul multiplexing form, and carry out smoother multimedia communication.

<Second Embodiment>

Hereinafter, there will be described a second embodiment in which a mode of automatically setting an additional channel and a mode of manually setting an additional channel at the user's discretion can be selected alternatively on demand.

Figure 14:
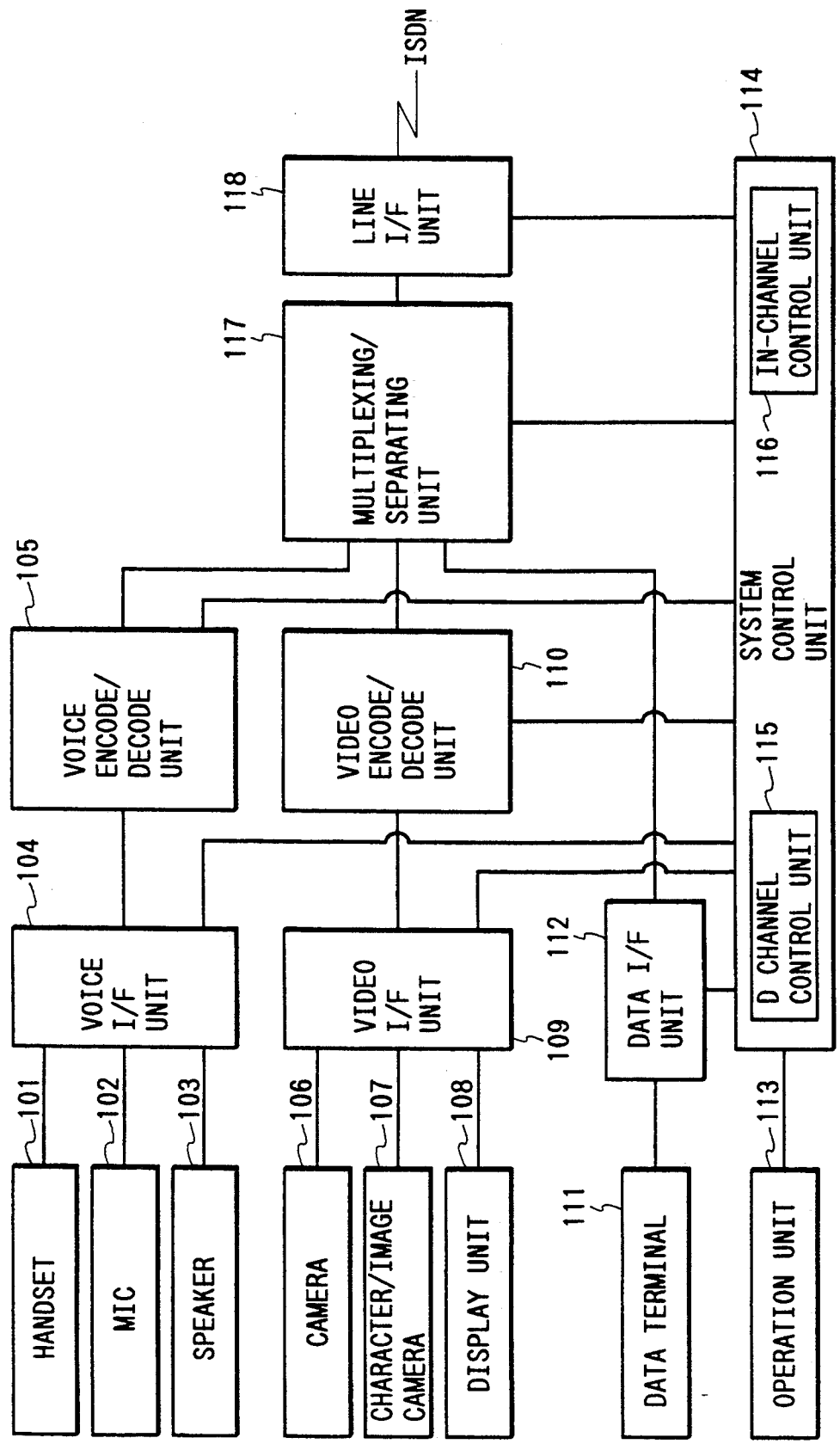
FIG. 14 is a block diagram showing a multimedia communicating apparatus according to a second embodiment of the present invention.

The second embodiment of the present invention will be explained below with reference to the drawings. FIG. 14 is a block diagram showing the configuration of a multimedia communicating apparatus according to the second embodiment of the present invention. In FIG. 14, denoted by 101 is a handset as one component of voice input/output means of the apparatus, 102 is a microphone as one component of voice input/output means of the apparatus, and 103 is a loud-speaker as one component of voice input/output means of the apparatus, these handset 101, microphone 102 and loudspeaker 103 being all connected to a voice I/F (interface) unit 104.

The voice I/F unit 104 performs, upon an instruction from a later-described system control unit 114, the switch process of switching the handset 101, the microphone 102 and the loudspeaker 103 from one to another in operation, the on/off-hook detection process of detecting whether the handset 101 is in an on-hook state or an off-hook state, the echo cancel process of eliminating an echo when the microphone 102 and the loudspeaker 103 are actuated, the process of producing tones such as a dial tone, call tone, busy tone and reception tone, etc. The voice I/F unit. 104 is connected to a voice encode/decode unit 105.

The voice encode/decode unit 105 functions to, upon an instruction from the system control unit 114, encode a transmission voice signal and decode a reception voice signal in accordance with the voice signal encoding and decoding algorithms such as 64 kbps PCM A-low, 64 kbps PCM μ-law, 64 kbps/56 kbps/48 kbps SB-ADPCM, 32 kbps ADPCM, 16 kbps (e.g., APC-AB), and 8 kbps.

Denoted by 106 is a camera as one component of video input means of the apparatus, through which a self-portrait or the like is inputted, and 107 is a character/image camera as one component of image input means of the apparatus, through which pictures, drawings or the like are inputted. 108 is an image display unit for displaying image inputted from the camera 106 or the character/image camera 107, images received from a partner's communicating terminal, an operation screen, etc. The camera 106, the character/image camera 107 and the image display unit 108 are all connected to a video I/F unit 109.

The video I/F unit 109 performs, upon an instruction from the system control unit 114, the switch process for the image input means, the display switch process of switching the input image, the reception image and the operation screen to be displayed on the image display unit 108 from one to another, the image signal synthesis process of displaying the input image, the reception image and the operation screen to be displayed on the image display unit 108 in a divided form, etc. The video I/F unit 109 is connected to a video encode/decode unit (or an image codec unit) 110.

The video encode/decode unit 110 functions to encode a transmission image signal and decode a reception image signal in accordance with the CCITT recommmendation draft H.261.

Denoted by 111 is a data terminal connected to a data I/F unit 112 for transmitting and receiving data. The data I/F unit 112 informs transmission data from the data terminal 111 and the system control unit 114 to a later-described a multiplexing/separating unit 117, and also informs reception data to the data terminal 111 and the system control unit 114.

Denoted by 113 is an operation unit comprising a key-board, a touch panel or the like through which is inputted control information necessary for overall control of the apparatus. The operation unit 113 is connected to the system control unit 114 along with the voice I/F unit 104, the voice encode/decode unit 105, the video I/F unit 109, the video encode/decode unit 110 and the data I/F unit 112.

The system control unit 114 comprises CPU, ROM, RAM, auxiliary storages and so forth, and has such functions as to monitor states of the respective units for controlling the entire apparatus, calculate transfer speeds allocated for respective media and make final judgment and control of a mode based on the input control information, line conditions in use, etc., create the operation/display screen depending on the situations, and execute an application program. The system control unit 11 comprises a D channel control unit 115 for performing call control and an inchannel control unit 116 for performing in-channel control.

The voice encode/decode unit 105, the video encode/decode unit 110 and the data I/F unit 112 are connected to a multiplexing/separating unit 117. This multiplexing/separating unit 117 functions to multiplex, in accordance with the CCITT recommendation draft H.221, a voice signal from the voice encode/decode unit 105, an image signal from the video encode/decode unit 110, data from the data I/F unit 112, and data from the system control unit 114, as well as control information, such as the CCITT recommendation drafts H.221 and H.242, in units of transmission frame, and to separate reception frames into component units of respective media, followed by informing them to the respective units. The multiplexing/separating unit 117 is connected to the system control unit and a line I/F unit 118.

The line I/F unit 118 is to control lines in accordance with a user network interface for ISDN.

The system control unit 114 constitutes first and second decision means, cause detection means, second detection means, and removal-of-cause detection means. The first decision means is to determine a multiplexing/transmission mode of multimedia information depending on the number of connections finally set. The second decision means is to judge the cause why an additional connection could not be set, and determine whether or not the setting of an additional connection is retried. The cause detection means is to detect the cause why an additional connection could not be set. The second detection means is to detect that an additional connection cannot be set in a reception side communicating apparatus. The removal-of-cause detection means is to detect that the cause preventing the setting of an additional connection could be removed.

The operation unit 113 and the system control unit 114 jointly constitute selection means. This selection means is to alternatively select and set an automatic setting mode of automatically setting an additional connection and a non-automatic setting mode of setting an additional connection at the user's discretion, when the additional connection is set by additional connection setting means.

The system control unit 114 and the multiplexing/separating unit 117 jointly constitute communication start means. When an additional connection could not be set in spite of the additional connection setting means being initiated, this communication start means is to start multiplexed communication of multimedia information by utilizing the connection set at that time.

The system control unit 114 and the multiplexing/separating unit 117 also jointly constitute judgment means. This judgment means is to carry out ability information exchange between the transmission side communicating apparatus and the reception side communicating apparatus upon establishment of a first connection, and to judge whether or not the reception side communicating apparatus has an ability of setting an additional connection.

Further, the system control unit 114 and the line interface unit 118 jointly constitute first and second setting means, setting retry means, and first detection means. The first setting means is to set an additional connection when the judgment means judges that the reception side communicating apparatus has an ability of setting an additional connection. The second setting means is to allow the reception side communicating apparatus to automatically set an additional connection based on a detected signal from the first detection means and a detected signal from the removal-of-cause detection means, when the second detection means detects that an additional connection cannot be detected. When the second decision means determines that the setting of an additional connection should be retried, the setting retry means is to automatically retry the setting of an additional connection after the lapse of a predetermined period of time from that decision. The first detection means detects that an additional connection is not set from the transmission side communicating apparatus even after the predetermined period of time in spite of the judgment means judging that the reception side communicating apparatus has an ability of setting an additional connection.

Communication control operation of the thus-arranged multimedia communicating apparatus according to the second embodiment of the present invention will be described below in detail with reference to a flowchart of FIG. 15.

At the outset, a step S401 registers an additional connection setting method (mode) for each of required partners (reception side communicating apparatus), i.e., whether an additional connection is set automatically or at the user's discretion. A step S402 and subsequent steps represent operation after initiation of the actual setting procedures.

In the step S402, a first connection between its own apparatus (transmission side communicating apparatus) and the partner's apparatus (reception side communicating apparatus) is established. The control program then goes to a step S403 to execute an ability judgment for the partner's apparatus on the basis of establishment of the frame synch through search and detection of FAS and delivery and detection of A bit over the first connection, as well as the ability information exchange sequence procedures using ability BAS. It is thus judged whether or not the partner's apparatus has an ability of setting an additional connection. Then, the multimedia multiplexing structure over the first connection is determined provisionally, if necessary, and the mode switch sequence procedures are executed using BAS commands to determine transmission/reception modes, followed by starting transmission.

Next, the control program goes to a step S404 to judge whether or not the setting of an additional connection is necessary based on the ability of its own apparatus and the ability of the partner's apparatus judged in the step S403. If the setting of an additional connection is judged necessary, then it goes to a step S405 to judge how the setting of an additional connection should be performed for the partner's apparatus, on the basis of the setting mode registered in the step S201.

Now, if the mode of setting an additional connection at the user's discretion is selected for the partner's apparatus, then a message as to whether or not an additional connection should be set is displayed on the display unit 108 in FIG. 14, thereby promoting the user to make a decision. The user instructs the decision contents through the operation unit 113 in FIG. 14.

If the user now instructs the setting of an additional connection, or if the mode of automatically setting an additional connection is selected in the preceding step S405, then the setting of an additional connection is initiated in a step S407, followed by the end of the present processing operation. If it is judged in the step S404 that the setting of an additional connection is not necessary, or if the user instructs in the step S406 not to set an additional connection, then the communication is continued over only the existing connection, followed by the end of the present processing operation.

While the above embodiment is explained as setting one additional connection, the case of setting plural additional connections can also be handled in a like manner. Furthermore, while the above embodiment is arranged to register the mode of setting an additional connection for each partner, it is also possible to perform the setting of an additional connection depending on the mode setting defined in the communicating apparatus at the present time, or to make the operation setting for each group of partner addresses rather than each particular partner. Alternatively, a default mode of setting an additional connection may be registered for the partner not registered.

Communication processing operation partly modified from the embodiment of FIG. 15 will be described below in detail with reference to a flowchart of FIG. 16.

At first, a step S501 establishes a first connection between its own apparatus and the partner's apparatus. The control program then goes to a step S502 to execute an ability judgment for the partner's apparatus on the basis of establishment of the frame synch through search and detection of FAS and delivery and detection of A bit over the first connection, as well as the ability information exchange sequence procedures using ability BAS. Then, the multimedia multiplexing structure over the first connection is determined provisionally, if necessary, and the mode switch sequence procedures are executed using BAS commands to determine transmission/reception modes, followed by starting transmission.

Next, the control program goes to a step S503 to judge whether or not the setting of an additional connection is necessary based on the ability of the partner's apparatus judged in the step S502. If the setting of an additional connection is judged necessary, then it goes to a step S504 to judge initiate the setting of an additional connection. Subsequently, it is judged in a step S505 whether or not the additional connection has been set.

If the additional connection has not been set for some reason, then the reason is reviewed to judge whether or not the setting of an additional connection should be retired automatically. If the setting is judged to be retried, then a timer is initiated in a next step S507 to retry the setting of an additional connection. Subsequently, its own apparatus waits in a step S508 for time-up of the timer adapted to initiate the retry. Upon the timer timing up, the control program returns to the step S504 to initiate the retry of setting an additional connection.

If it is judged in the step S503 that the setting of an additional connection is not necessary, or if the additional connection has been set in the step S505, or if it is judged in the step S506 that the additional connection has not been set, but the automatic retry of setting an additional connection is not necessary, then the control program goes to a step S509 in any case where the final transmission mode and reception mode are determined through the mode switch sequence procedures using BAS commands depending on the number of connections at the present time to start multimedia multiplexed communication in accordance with the respective modes, followed by the end of the present processing operation.

Note that while the above embodiment shown in FIG. 16 is also explained as setting one additional connection, the case of setting plural additional connections can also be handled in a like manner. Furthermore, the judgment as to whether or not to retry the setting of an additional connection may be given depending on the sort of the partner, rather than only the reason why the additional connection could not be set.

Communication processing operation according to another embodiment will be described below in detail with reference to a flowchart of FIG. 17.

At first, a step S601 establishes a first connection between its own apparatus and the partner's apparatus. The control program then goes to a step S602 to execute an ability judgment for the partner's apparatus on the basis of establishment of the frame synch through search and detection of FAS and delivery and detection of A bit over the first connection, as well as the ability information exchange sequence procedures using ability BAS. Then, the multimedia multiplexing structure over the first connection is determined provisionally, if necessary and the mode switch sequence procedures are executed using BAS commands to determine transmission/reception modes, followed by starting transmission.

Next, the control program goes to a step S603 to judge whether or not the setting of an additional connection is necessary based on the ability of the partner's apparatus judged in the step S602. If the setting of an additional connection is judged necessary, then it goes to a step S604 where the setting of an additional connection is first initiated from the transmitting side apparatus (its own apparatus) of the first connection.

Subsequently, it is judged in a step S605 whether or not the additional connection has been set. If the additional connection has not been set, then the control program goes to a step S606 to judge whether or not the factor preventing the setting of an additional connection could be detected by the reception side apparatus. For example, when the fact that the reception side apparatus is using one channel for data communication with another apparatus could be clearly judged, then it goes to a step S607 to wait for the factor being eliminated, i.e., the end of that data communication.

If the factor has been eliminated, then the control program goes to a step S608 to receive the additional connection setting from the reception side apparatus, followed by returning to the above step S605. If the factor preventing the setting of an additional connection could not be detected on the reception side in the step S606, then it goes to a step S609 to initiate a timer.

Thereafter, it is judged in a step S610 whether or not the setting of an additional connection has been retried from the transmission side apparatus. If the setting of an additional connection is retried from the transmission side apparatus, then the control program goes to a step S611 to judge whether or not the timer initiated in the step S609 times up.

If the timer times up in the step S611, then the control program goes to the step S608, and if not, then it returns to the step S610. Further, if it is judged in the step S603 that the setting of an additional connection is not necessary, or if it is judged in the step S605 that the additional connection has been set, then the control program goes to a step S612 where the final transmission mode and reception mode are determined through the mode switch sequence procedures using BAS commands depending on the number of connections at the present time to start multimedia multiplexed communication in accordance with the respective modes, followed by the end of the present processing operation.

Additionally, when setting an additional connection from the reception side in the step S608, billing may be selected to be charged on the reception side having received the setting of the additional connection.

Figure 17:
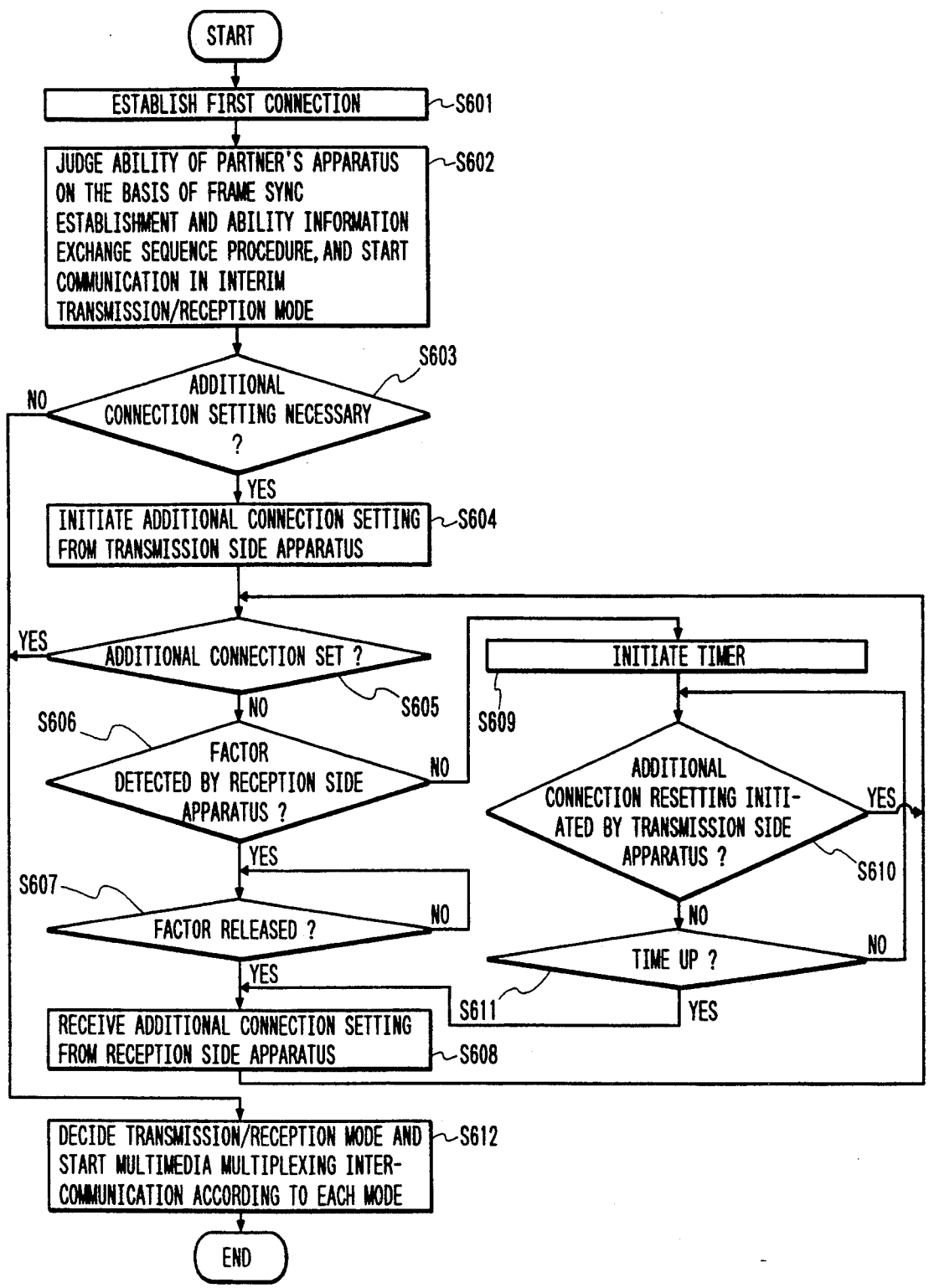
Figure 18:
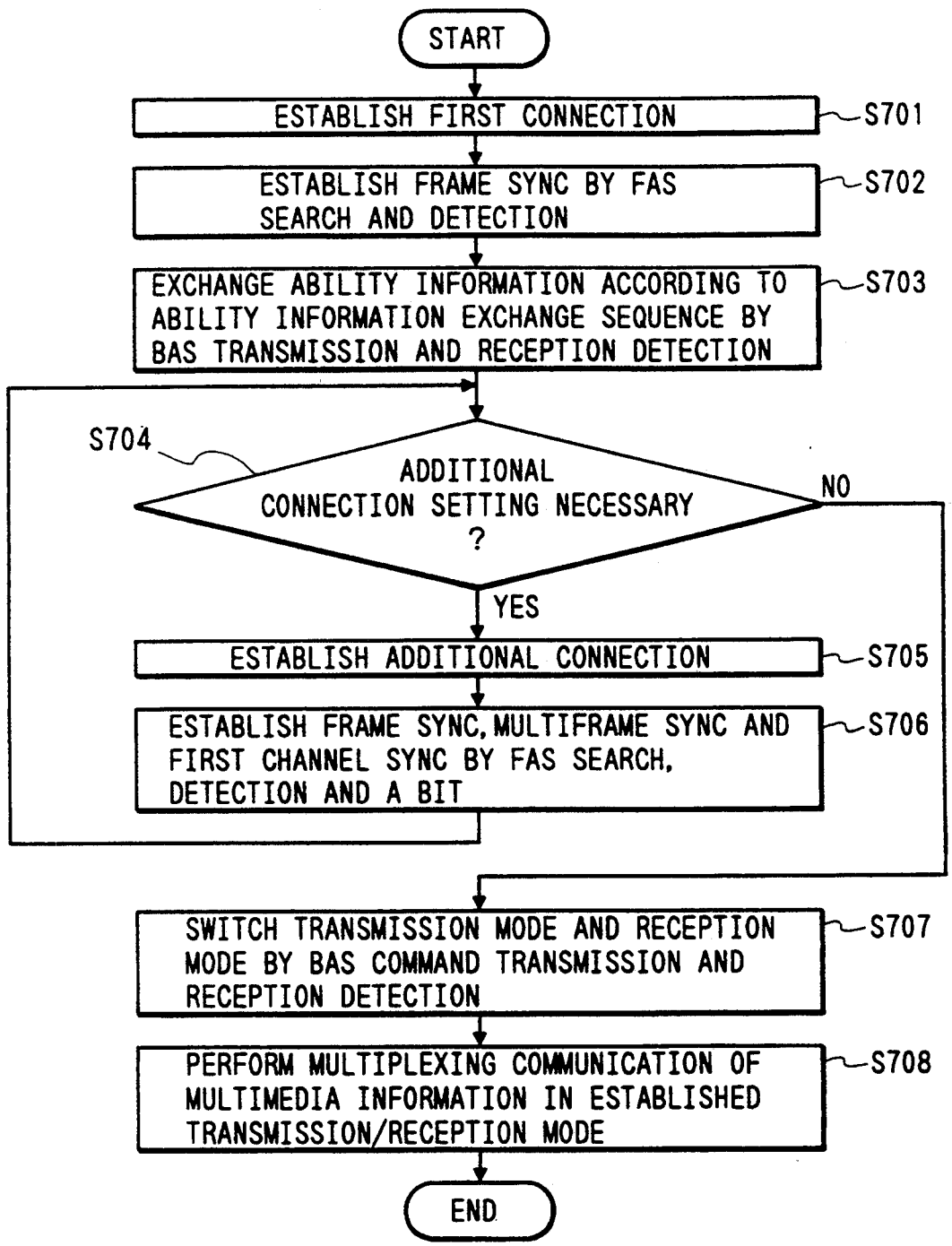
FIG. 18 is a flowchart showing one example of communication processing procedures for a conventional multimedia communicating apparatus.

Note that while the above embodiment shown in FIG. 17 is also explained as setting one additional connection, the case of setting plural additional connections can also be handled in a like manner. Furthermore, the judgment as to whether or not to initiate the setting of an additional connection from the reception side apparatus, after time-up of the timer in the step S611 or after removal of the factor in the step S607, may be given depending on the sort of the partner.

Figure 15:
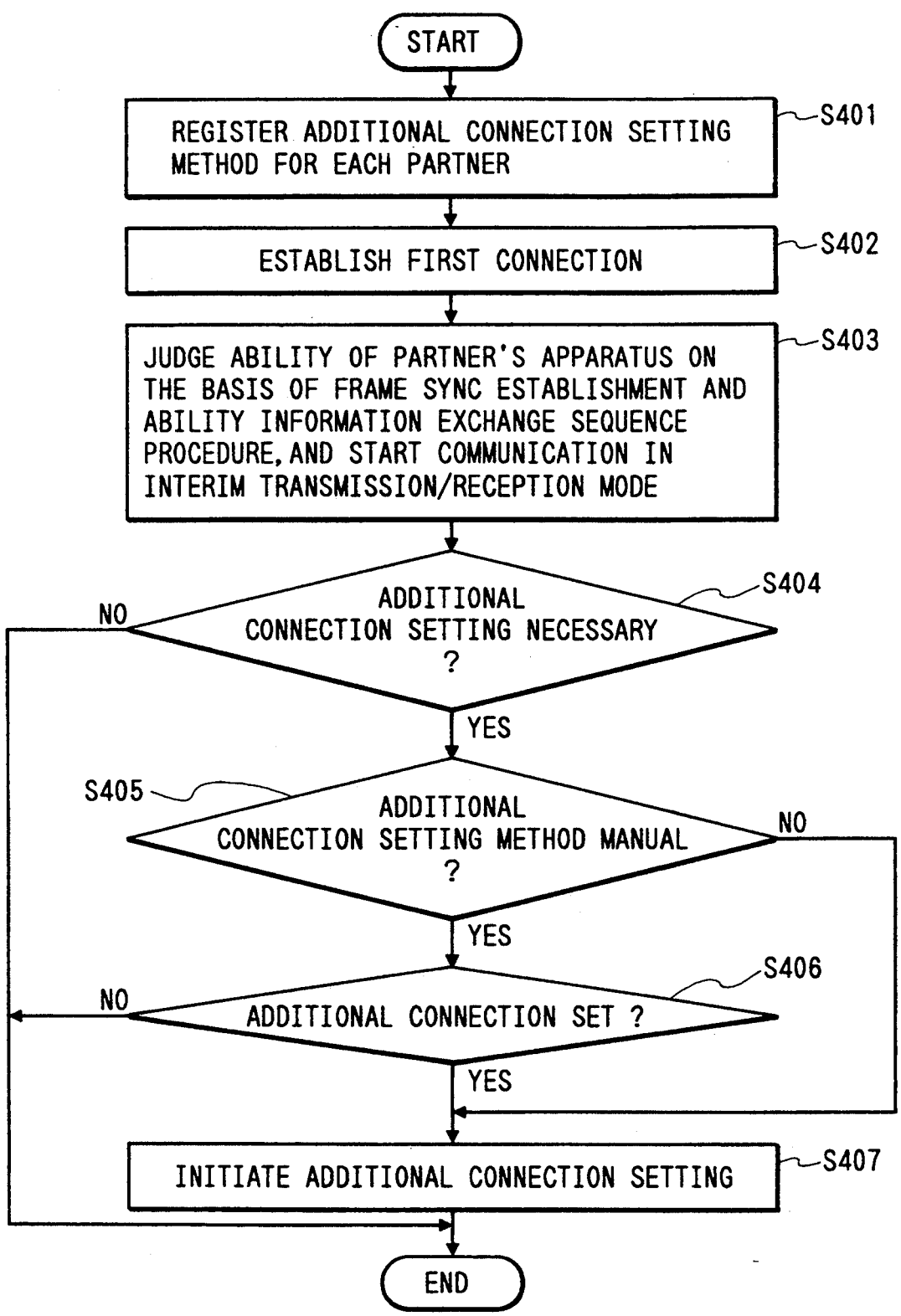
FIGS. 15 to 17 are flowcharts showing communication control procedures for the multimedia communicating apparatus according to the second embodiment of the present invention.

With the multimedia communicating apparatus shown in FIG. 15, as described above, when setting of an additional connection through ability information exchange between the transmission side communicating apparatus and the reception side communicating apparatus upon establishment of the first connection and the judgment as to whether or not the reception side communicating apparatus has an ability of setting an additional connection, the operation to be made by the user can be lessened by selectively setting the mode of automatically setting of an additional connection for such communication with particular partner with whom information is routinely communicated.

Also, by selectively setting the mode of setting an additional connection at the user's discretion always in long-distance or oversea communication, the line charge can be prevented from wastefully building up.

Since the mode of automatically setting an additional connection and the mode of setting an additional connection at the user's discretion can be selectively set for each reception side communicating apparatus, the setting management can be effected in a more delicate manner.

Further, with the multimedia communicating apparatus shown in FIG. 16, when the first setting of an additional connection has failed for some reason, retry of the setting can be automatically initiated after a predetermined period of time depending on the reason. It is therefore possible to realize communication environment in a desired mode without making a user conscious of intricacy in the operation.

Moreover, with the multimedia communicating apparatus shown in FIG. 17, when such an apparent factor that the reception side communicating apparatus is using another channel for communication with another apparatus can be detected upon a failure in setting an additional connection, the setting of an additional connection is initiated in the reception side communicating apparatus at the timing that factor is removed, taking into account the fact that the transmission side communicating apparatus cannot know the timing that channel becomes free. This enables positive execution of the additional connection setting procedures. When the setting of an additional connection is not set from the transmission side communicating apparatus even after a predetermined period of time in spite of the reception side having an ability of setting an additional connection, and the reception side communicating apparatus demands the mode of setting an additional connection, the setting of an additional connection can be automatically initiated from the reception side communicating apparatus after the lapse of the predetermined period of time. This enables the user on the reception side to set a desired mode without requiring an special operation.

In addition, for the purpose of solving the problem of line charge when setting an additional connection from the reception side communicating apparatus, the means for initiating that setting to charge billing on the reception side is provided for lines capable of selecting a reception side billing basis, making it possible to realize even more reasonable communication environment.

What is claimed is:

1. A multimedia communicating apparatus comprising:

communication means for transmitting and receiving plural types of media information in a multiplexed form, said plural types of media information including voice, data and video information; and control means for allocating a large-capacity transfer speed to transmission of data information when said communication means is to transmit the data information for which two-way communication is not needed, said control means being operative to allocate a small-capacity transfer speed to transmission of said data information, so as to transmit control data necessary for receiving said data information, when said communication means is to receive said data information, and allocate an as large as possible capacity transfer speed to the transmission of the voice or video information for which two-way communication is needed.

2. A multimedia communicating apparatus according to claim 1, wherein, when said data information is G4 facsimile data, said control means allocates the large-capacity transfer speed to transmission of said data information.

3. A multimedia communicating apparatus according to claim 1, wherein said multimedia communicating apparatus is connected to an integrated Service Digital Network (ISDN).

4. A multimedia communicating apparatus comprising:

communication means for performing communication by transmitting and receiving plural types of media information in multiplexed form including voice, data and video information; and control means for allocating a predetermined transfer speed to each of said plural types of media information and transmitting said plural types of media information using said communication means during the data information communication in one communication, said control means being operative for detecting variations in quantity of information included in said media information transmitted, and for automatically changing said transfer speed which was set before data communication, during the data communication in the one communication, depending on the variations in quantity of information detected, wherein said variations in quantity of information included in the data information are detected in said control means, and the transfer speed of data is automatically changed depending on said variations detected in said control means.

5. A multimedia communicating apparatus comprising:

communication means for communicating plural types of media information with a partner's communicating apparatus using a plurality of channels;

judgment means for setting a first channel prior to a communication of the multimedia information, exchanging ability information with said partner's communicating apparatus by the set first channel, and judging whether or not said partner's communicating apparatus has an ability of setting an additional channel;

setting means for setting an additional channel when said judgment means judges that said partner's communicating apparatus has an ability of setting an additional channel; and selection means for selecting an automatic setting mode for automatically setting an additional channel and a manual setting mode for setting an additional channel at the operator's discretion, at the time of setting an additional channel by said setting means.

6. A multimedia communicating apparatus according to claim 5, wherein said selection means can select said automatic setting mode or said manual setting mode for each said partner's communicating apparatus.

7. A multimedia communicating apparatus according to claim 5, further comprising control means for, when an additional channel cannot be set by said setting means for some reason, judging the reason and determining whether or not setting of an additional channel should be retried, and setting retry means for retrying to set an additional channel after a lapse of a predetermined period of time depending on the result judged by said control means.

8. A multimedia communicating apparatus according to claim 5, further comprising control means for, when an additional channel cannot be set by said setting means for some cause, judging whether or not said cause occurs in said partner's communicating apparatus, wherein said multimedia communicating apparatus receives a setting of an additional channel from said partner's communicating apparatus after said cause has been removed.

9. A multimedia communicating apparatus according to claim 5, wherein said communication means communicates voice, data and video information with said partner's communicating apparatus using said plurality of channels in a multiplexed form.

10. A multimedia communicating apparatus comprising:
   communication means for communicating plural types of media information with a partner's communicating apparatus using a plurality of channels;
   judgment means for setting a first channel prior to a communication of the multimedia information, exchanging ability information with said partner's communicating apparatus by the set first channel, and judging whether or not said partner's communicating apparatus has an ability of setting an additional channel;
   setting means for setting an additional channel when said judgment means judges that said partner's communicating apparatus has an ability of setting an additional channel;
   control means for, when an additional channel cannot be set by said setting means for some reason, judging the reason and determining whether or not setting of an additional channel should be retried; and
   setting retry means for retrying to set an additional channel after a lapse of a predetermined period of time depending on the result judged by said control means.

11. A multimedia communicating apparatus comprising:
   communication means for communicating plural types of media information with a partner's communication apparatus using a plurality of channels;
   judgment means for setting a first channel prior to a communication of the multimedia information, exchanging ability information with said partner's communicating apparatus by the set first channel, and judging whether or not said partner's communicating apparatus has an ability of setting an additional channel;
   setting means for setting an additional channel when said judgment means judges that said partner's communicating apparatus has an ability of setting an additional channel;
   control means for, when an additional channel cannot be set by said setting means for some cause, judging whether or not said cause occurs in said partner's communicating apparatus; and
   setting retry mean for receiving a setting of an additional channel from said partner's communicating apparatus and retrying to set the additional channel after said cause has been removed.

* * * * *

UNITED STATES PATENT AND TRADEMARK OFFICE
CERTIFICATE OF CORRECTION

PATENT NO. : 5,367,522
DATED : November 22, 1994
INVENTOR(S) : MASATOSHI OTANI

Page 1 of 2

It is certified that error appears in the above-identified patent and that said Letters Patent is hereby corrected as shown below:

IN THE DRAWINGS

Sheet 3 of 16, FIG. 3B: "BITRATE" should read --BIT RATE--.

COLUMN 1

Line 67, "(low" should read --(Low--.

COLUMN 2

Line 62, "plurality" should read --plurality of--.

COLUMN 4

Line 16, "oversea" should read --overseas--.

COLUMN 5

Line 11, "an" should read --a--.

COLUMN 9

Line 1, "stands" should read --stand--.
Line 3, "stands" should read --stand--.

COLUMN 16

Line 32, "a" should be deleted.
Line 54, "inchannel" should read --in-channel--.

COLUMN 17

Line 14, "the cause" should read --the cause of--.

UNITED STATES PATENT AND TRADEMARK OFFICE
CERTIFICATE OF CORRECTION

PATENT NO. : 5,367,522
DATED : November 22, 1994
INVENTOR(S) : MASATOSHI OTANI

It is certified that error appears in the above-identified patent and that said Letters Patent is hereby corrected as shown below:

COLUMN 19

Line 26, "judge" should be deleted.
   Line 33, "retired" should read --retried--.

COLUMN 21

Line 18, "oversea" should read --overseas--.

COLUMN 22

Line 24, "integrated" should read --Integrated--.

Signed and Sealed this

Thirtieth Day of May, 1995

Attest:

BRUCE LEHMAN

*Attesting Officer*     *Commissioner of Patents and Trademarks*